(12) United States Patent
Jones et al.

(10) Patent No.: US 9,383,825 B2
(45) Date of Patent: Jul. 5, 2016

(54) UNIVERSAL SCRIPT INPUT DEVICE AND METHOD

(71) Applicants: Nicolas Jones, Kitchener (CA); Michael Goodgoll, Waterloo (CA)

(72) Inventors: Nicolas Jones, Kitchener (CA); Michael Goodgoll, Waterloo (CA)

( * ) Notice: Subject to any disclaimer, the term of this patent is extended or adjusted under 35 U.S.C. 154(b) by 213 days.

(21) Appl. No.: 14/142,909

(22) Filed: Dec. 29, 2013

(65) Prior Publication Data

US 2014/0189610 A1 Jul. 3, 2014

Related U.S. Application Data

(60) Provisional application No. 61/747,694, filed on Dec. 31, 2012.

(51) Int. Cl.
*G06F 13/00* (2006.01)
*G06F 15/00* (2006.01)
*G06F 3/01* (2006.01)
*G06F 3/02* (2006.01)
*G06F 3/023* (2006.01)

(52) U.S. Cl.
CPC .............. *G06F 3/017* (2013.01); *G06F 3/0219* (2013.01); *G06F 3/0235* (2013.01)

(58) Field of Classification Search
CPC ..................... G06F 2/04886; G06F 3/04886
USPC .......... 715/773, 863, 517, 810, 706, 712, 851
See application file for complete search history.

(56) References Cited

U.S. PATENT DOCUMENTS

| 6,020,881 | A  | * | 2/2000  | Naughton et al. ............. 715/740 |
| 7,877,705 | B2 | * | 1/2011  | Chambers et al. ............ 715/835 |
| 8,896,543 | B2 | * | 11/2014 | Ettinger ........................ 345/171 |
| 2008/0191898 | A1 | * | 8/2008  | Janik ........................ 340/825.22 |
| 2010/0269152 | A1 | * | 10/2010 | Pahlavan et al. .................. 726/3 |
| 2012/0013539 | A1 | * | 1/2012  | Hogan et al. .................. 345/173 |
| 2013/0055153 | A1 | * | 2/2013  | Sherman et al. .............. 715/810 |
| 2014/0123049 | A1 | * | 5/2014  | Buxton et al. ................ 715/773 |

* cited by examiner

*Primary Examiner* — Kevin Nguyen

(57) ABSTRACT

A method providing for input of any script/language, on any computing device, mobile or otherwise by conveying Unicode characters to the computing device instead of keyboard scan codes that require further processing. The method includes all script/language processing independent from the computing device, permits changing input script/language "on-the-fly", provides for a universal platform-independent method to select each particular script/language, and requires no language-specific support on the computing device, other than the ability to display the selected script. The method also provides for input of commands and backward-compatible input using legacy keyboard key codes.

18 Claims, 43 Drawing Sheets

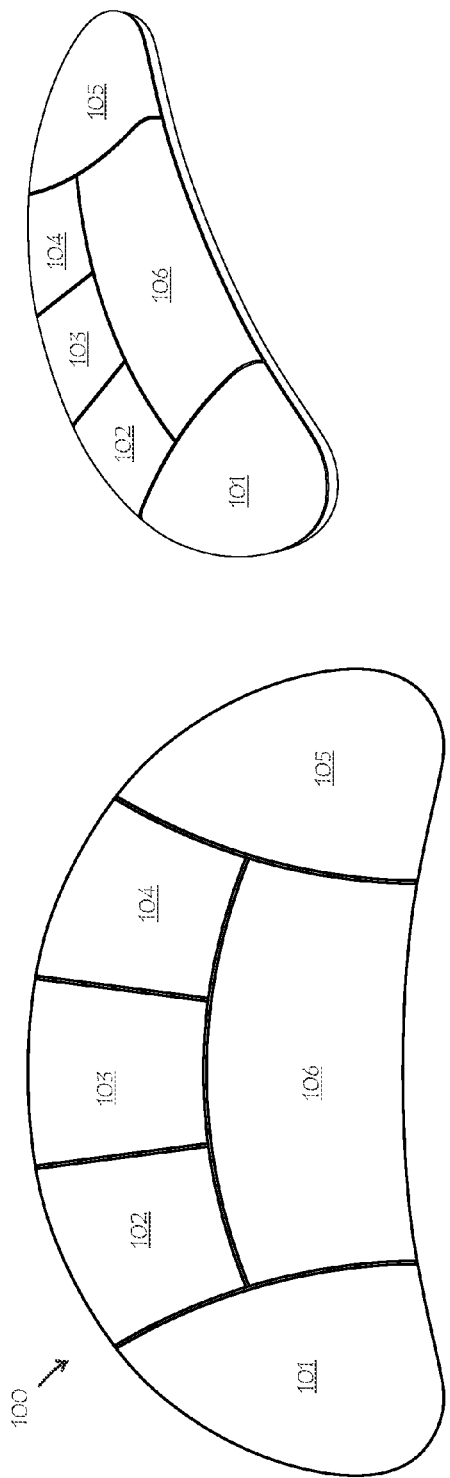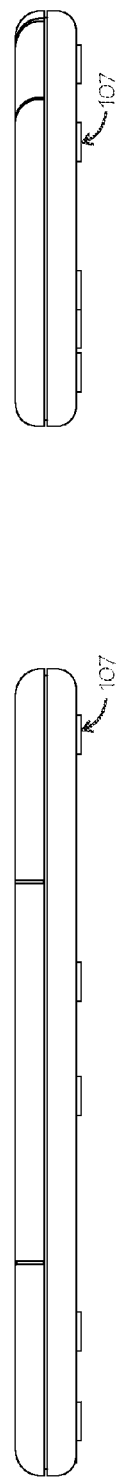
Fig.1

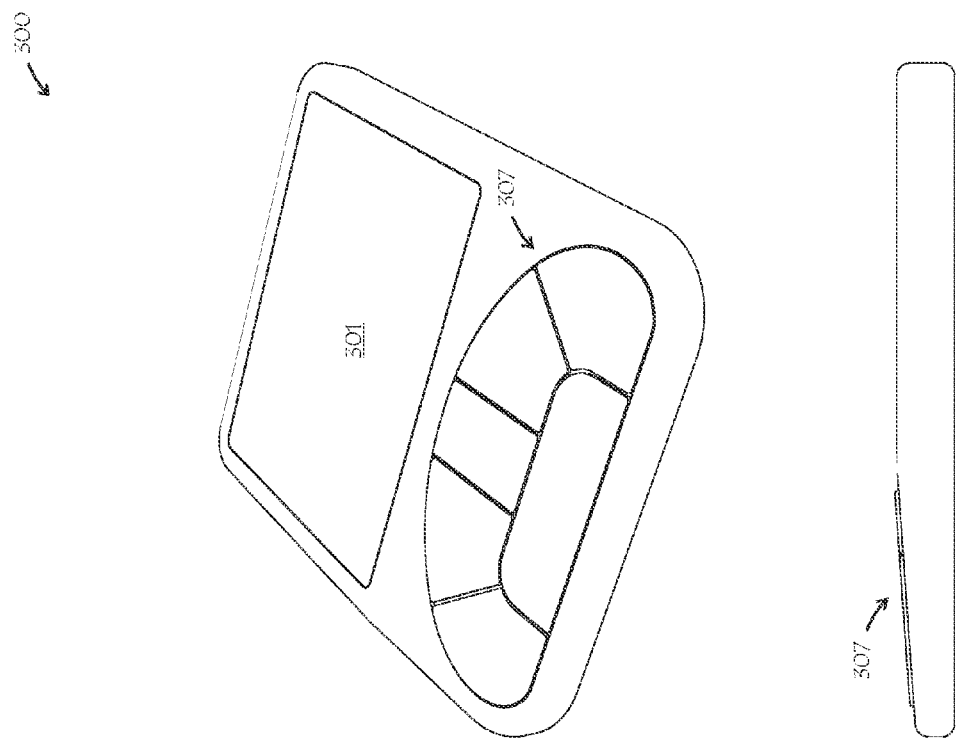
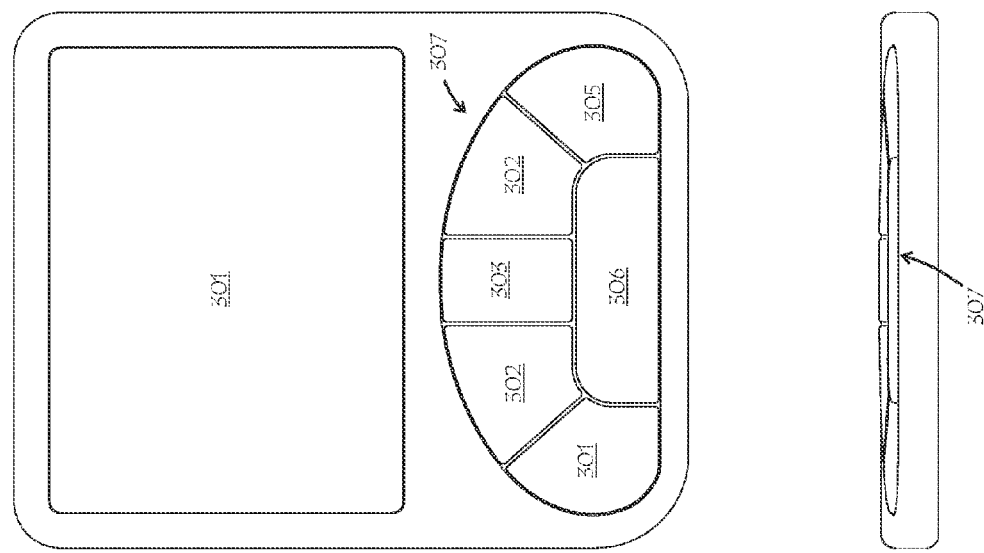
Fig.3

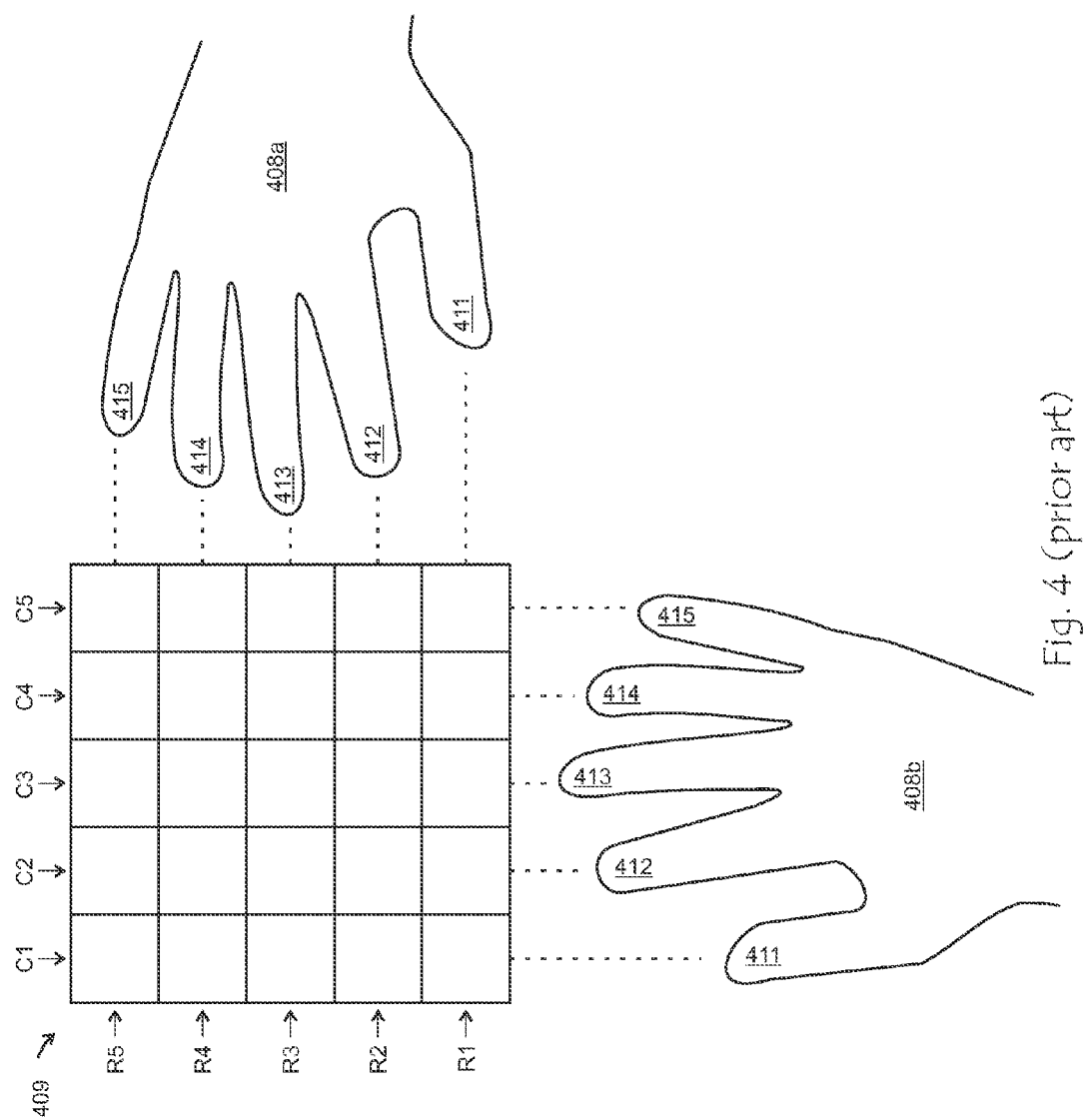

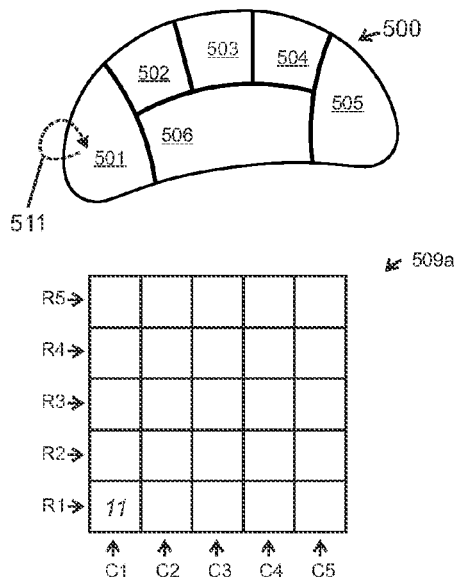
Fig. 5a (prior art)
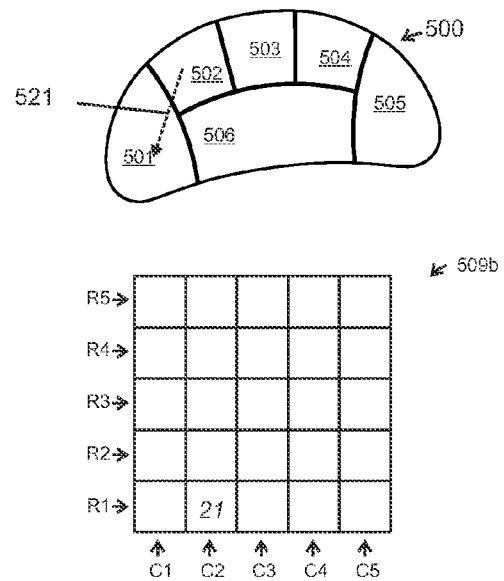
Fig. 5b (prior art)
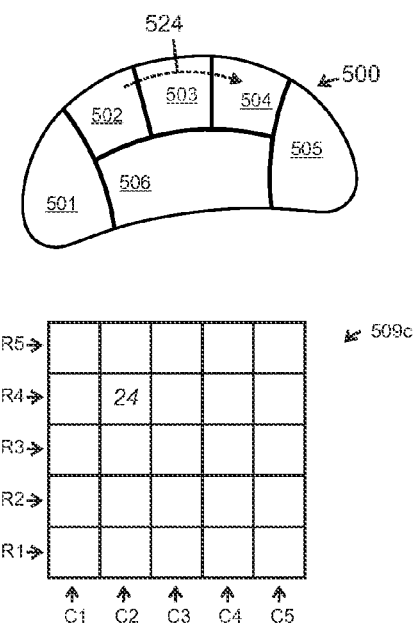
Fig. 5c (prior art)
Fig. 5d (prior art)

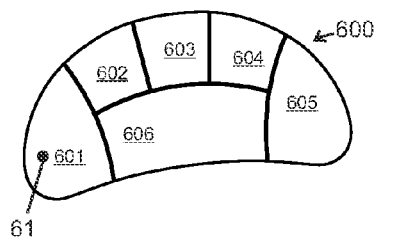
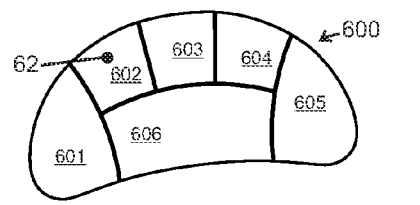
Fig. 6a (prior art)
Fig. 6b (prior art)
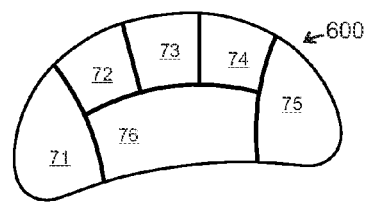
Fig. 6c (prior art)
Fig. 6d (prior art)

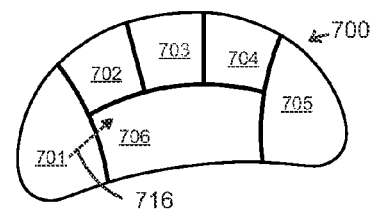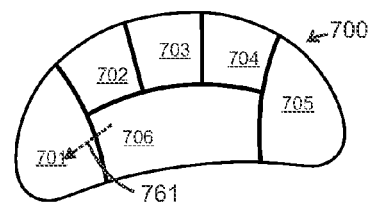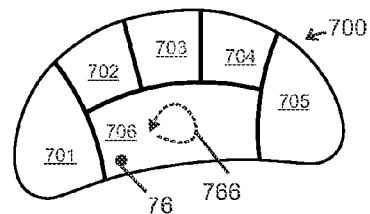
Fig. 7a        Fig. 7b
Fig. 7c        Fig. 7d

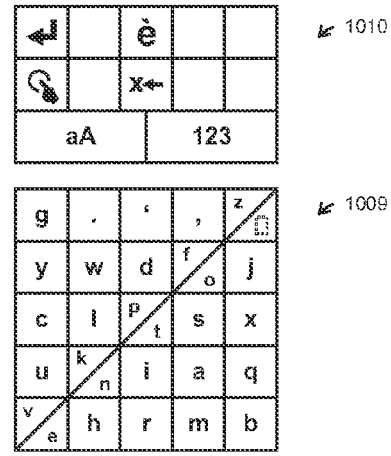

Fig. 10a

Language:English, Map:Default, Table:"Lower Case"

| 0 | Character 'e' |
|---|---|
| 1 | Character 'n' |
| 2 | Character 't' |
| 3 | Character 'o' |
| 4 | Character <space> |
| 5 | Control: Set Table "Upper Case" |
| 6 | Character 'v' |
| 7 | Character 'u' |
| 8 | Character 'c' |
| 9 | Character 'y' |
| 10 | Character 'g' |
| 11 | Control: Select Language |
| 12 | Character 'h' |
| 13 | Character 'k' |
| 14 | Character 'l' |
| 15 | Character 'w' |
| 16 | Character '.' |
| 17 | Null |
| 18 | Character 'r' |
| 19 | Character 'i' |
| 20 | Character 'p' |

| 21 | Character 'd' |
|---|---|
| 22 | Character <apostrophe> |
| 23 | Character <backspace> |
| 24 | Character 'm' |
| 25 | Character 'a' |
| 26 | Character 's' |
| 27 | Character 'f' |
| 28 | Character ',' |
| 29 | Null |
| 30 | Character 'b' |
| 31 | Character 'q' |
| 32 | Character 'x' |
| 33 | Character 'j' |
| 34 | Character 'z' |
| 35 | Null |
| 36 | Character <Carriage Return> |
| 37 | Null |
| 38 | Character U+02C7 (diacritic select) |
| 39 | Null |
| 40 | Null |
| 41 | Control: Set Table "Numerals" |

Language:English, Map:Default Table:"Upper Case"

| | |
|---|---|
| 0 | Character 'E' |
| 1 | Character 'N' |
| 2 | Character 'T' |
| 3 | Character 'O' |
| 4 | Character <space> |
| 5 | Control: Toggle (Lock/Last Table) |
| 6 | Character 'V' |
| 7 | Character 'U' |
| 8 | Character 'C' |
| 9 | Character 'Y' |
| 10 | Character 'G' |
| 11 | Control: Select Language |
| 12 | Character 'H' |
| 13 | Character 'K' |
| 14 | Character 'L' |
| 15 | Character 'W' |
| 16 | Character ',' |
| 17 | Null |
| 18 | Character 'R' |
| 19 | Character 'I' |
| 20 | Character 'P' |

| | |
|---|---|
| 21 | Character 'D' |
| 22 | Character <apostrophe> |
| 23 | Character <backspace> |
| 24 | Character 'M' |
| 25 | Character 'A' |
| 26 | Character 'S' |
| 27 | Character 'F' |
| 28 | Character ',' |
| 29 | Null |
| 30 | Character 'B' |
| 31 | Character 'Q' |
| 32 | Character 'X' |
| 33 | Character 'J' |
| 34 | Character 'Z' |
| 35 | Null |
| 36 | Character <Carriage Return> |
| 37 | Null |
| 38 | Character U+02C7 (diacritic select) |
| 39 | Null |
| 40 | Null |
| 41 | Control: Set Table "Numerals" |

Language:English, Map:Default, Table:"Numerals"

| 0  | Character '0'            | 21 | Character '='                       |
|----|--------------------------|----|-------------------------------------|
| 1  | Character '1'            | 22 | Character <quote>                   |
| 2  | Character '2'            | 23 | Character <backspace>               |
| 3  | Character '3'            | 24 | Character '9'                       |
| 4  | Character <space>        | 25 | Character '/'                       |
| 5  | Control: Null            | 26 | Character '*'                       |
| 6  | Character '$'            | 27 | Character '#'                       |
| 7  | Character '4'            | 28 | Character ','                       |
| 8  | Character '5'            | 29 | Null                                |
| 9  | Character '6'            | 30 | Character '('                       |
| 10 | Character ')'            | 31 | Character '?'                       |
| 11 | Control: Select Language | 32 | Character ':'                       |
| 12 | Character '7'            | 33 | Character ';'                       |
| 13 | Character '!'            | 34 | Character '%'                       |
| 14 | Character '-'            | 35 | Null                                |
| 15 | Character '\'            | 36 | Character <Carriage Return>         |
| 16 | Character '.'            | 37 | Null                                |
| 17 | Null                     | 38 | Character U+02C7 (diacritic select) |
| 18 | Character '8'            | 39 | Null                                |
| 19 | Character '+'            | 40 | Null                                |
| 20 | Character '@'            | 41 | Control: Toggle (Lock/Last Table)   |

Fig. 12b

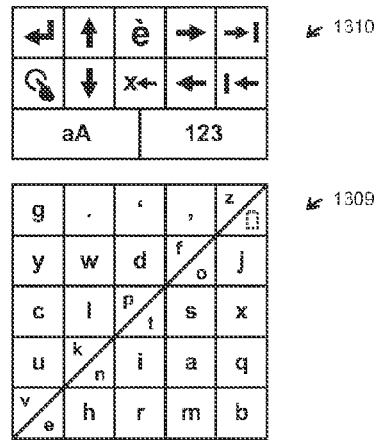

Fig. 13a

Language:English, Map:Generic With Cursor Keys,, Table:"Lower Case"

| 0 | Character 'e' | | 21 | Character 'd' |
|---|---|---|---|---|
| 1 | Character 'n' | | 22 | Character <apostrophe> |
| 2 | Character 't' | | 23 | Character <backspace> |
| 3 | Character 'o' | | 24 | Character 'm' |
| 4 | Character <space> | | 25 | Character 'a' |
| 5 | Control: Set Table "Upper Case" | | 26 | Character 's' |
| 6 | Character 'v' | | 27 | Character 'f' |
| 7 | Character 'u' | | 28 | Character ',' |
| 8 | Character 'c' | | 29 | Key Code <Left Arrow> |
| 9 | Character 'y' | | 30 | Character 'b' |
| 10 | Character 'g' | | 31 | Character 'q' |
| 11 | Control: Select Language | | 32 | Character 'x' |
| 12 | Character 'h' | | 33 | Character 'j' |
| 13 | Character 'k' | | 34 | Character 'z' |
| 14 | Character 'l' | | 35 | Key Code <Home> |
| 15 | Character 'w' | | 36 | Character <Carriage Return> |
| 16 | Character '.' | | 37 | Key Code <Up Arrow> |
| 17 | Key Code <Down Arrow> | | 38 | Character U+02C7 (diacritic select) |
| 18 | Character 'r' | | 39 | Key Code <Right Arrow> |
| 19 | Character 'i' | | 40 | Key Code <End> |
| 20 | Character 'p' | | 41 | Control: Set Table "Numerals" |

Fig. 13b

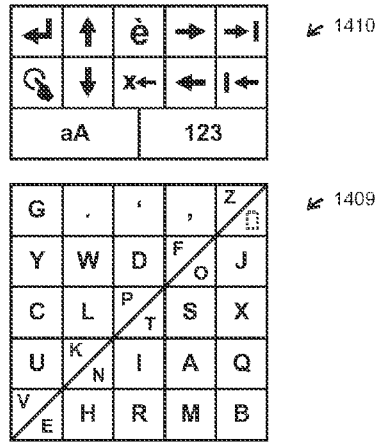

Fig. 14a

Language:English, Map:Generic With Cursor Keys,, Table:"Upper Case"

| | | | | |
|---|---|---|---|---|
| 0 | Character 'E' | 21 | Character 'D' |
| 1 | Character 'N' | 22 | Character <apostrophe> |
| 2 | Character 'T' | 23 | Character <backspace> |
| 3 | Character 'O' | 24 | Character 'M' |
| 4 | Character <space> | 25 | Character 'A' |
| 5 | Control: Toggle (Lock/Last Table) | 26 | Character 'S' |
| 6 | Character 'V' | 27 | Character 'F' |
| 7 | Character 'U' | 28 | Character ',' |
| 8 | Character 'C' | 29 | Key Code <Left Arrow> |
| 9 | Character 'Y' | 30 | Character 'B' |
| 10 | Character 'G' | 31 | Character 'Q' |
| 11 | Control: Select Language | 32 | Character 'X' |
| 12 | Character 'H' | 33 | Character 'J' |
| 13 | Character 'K' | 34 | Character 'Z' |
| 14 | Character 'L' | 35 | Key Code <Home> |
| 15 | Character 'W' | 36 | Character <Carriage Return> |
| 16 | Character '.' | 37 | Key Code <Up Arrow> |
| 17 | Key Code <Down Arrow> | 38 | Character U+02C7 (diacritic select) |
| 18 | Character 'R' | 39 | Key Code <Right Arrow> |
| 19 | Character 'I' | 40 | Key Code <End> |
| 20 | Character 'P' | 41 | Control: Set Table "Numerals" |

Fig. 14b

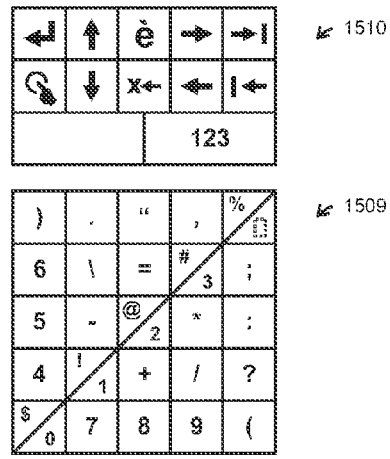

Fig. 15a

Language:English, Map:Generic With Cursor Keys,, Table:"Numerals"

| 0 | Character '0' | 21 | Character '=' |
|---|---|---|---|
| 1 | Character '1' | 22 | Character <quote> |
| 2 | Character '2' | 23 | Character <backspace> |
| 3 | Character '3' | 24 | Character '9' |
| 4 | Character <space> | 25 | Character '/' |
| 5 | Control: Null | 26 | Character '*' |
| 6 | Character '$' | 27 | Character '#' |
| 7 | Character '4' | 28 | Character ',' |
| 8 | Character '5' | 29 | Key Code <Left Arrow> |
| 9 | Character '6' | 30 | Character '(' |
| 10 | Character ')' | 31 | Character '?' |
| 11 | Control: Select Language | 32 | Character ':' |
| 12 | Character '7' | 33 | Character ';' |
| 13 | Character '!' | 34 | Character '%' |
| 14 | Character '-' | 35 | Key Code <Home> |
| 15 | Character '\' | 36 | Character <Carriage Return> |
| 16 | Character '.' | 37 | Key Code <Up Arrow> |
| 17 | Key Code <Down Arrow> | 38 | Character U+02C7 (diacritic select) |
| 18 | Character '8' | 39 | Key Code <Right Arrow> |
| 19 | Character '+' | 40 | Key Code <End> |
| 20 | Character '@' | 41 | Control: Toggle (Lock/Last Table) |

Fig. 15b

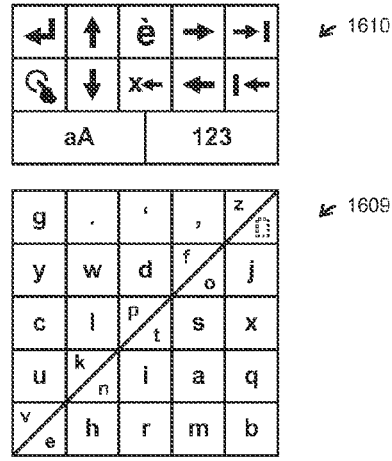

Fig. 16a

Language:English, Map:QWERTY Keycodes, Table:"Lower Case"

| 0 | Key Code 'e' | | 21 | Key Code 'd' |
|---|---|---|---|---|
| 1 | Key Code 'n' | | 22 | Key Code <apostrophe> |
| 2 | Key Code 't' | | 23 | Key Code <backspace> |
| 3 | Key Code 'o' | | 24 | Key Code 'm' |
| 4 | Key Code <space> | | 25 | Key Code 'a' |
| 5 | Control: Set Table "Upper Case" | | 26 | Key Code 's' |
| 6 | Key Code 'v' | | 27 | Key Code 'f' |
| 7 | Key Code 'u' | | 28 | Key Code ',' |
| 8 | Key Code 'c' | | 29 | Key Code <Left Arrow> |
| 9 | Key Code 'y' | | 30 | Key Code 'b' |
| 10 | Key Code 'g' | | 31 | Key Code 'q' |
| 11 | Control: Select Language | | 32 | Key Code 'x' |
| 12 | Key Code 'h' | | 33 | Key Code 'j' |
| 13 | Key Code 'k' | | 34 | Key Code 'z' |
| 14 | Key Code 'l' | | 35 | Key Code <Home> |
| 15 | Key Code 'w' | | 36 | Key Code <Carriage Return> |
| 16 | Key Code '.' | | 37 | Key Code <Up Arrow> |
| 17 | Key Code <Down Arrow> | | 38 | Control: Null |
| 18 | Key Code 'r' | | 39 | Key Code <Right Arrow> |
| 19 | Key Code 'i' | | 40 | Key Code <End> |
| 20 | Key Code 'p' | | 41 | Control: Set Table "Numerals" |

Fig. 16b

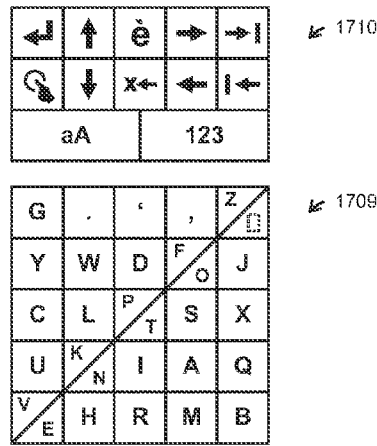

Fig. 17a

Language:English, Map:QWERTY Keycodes, Table:"Upper Case"

| 0 | Key Code <shift> + 'e' | | 21 | Key Code <shift> + 'd' |
|---|---|---|---|---|
| 1 | Key Code <shift> + 'n' | | 22 | Key Code <apostrophe> |
| 2 | Key Code <shift> + 't' | | 23 | Key Code <backspace> |
| 3 | Key Code <shift> + 'o' | | 24 | Key Code <shift> + 'm' |
| 4 | Key Code <space> | | 25 | Key Code <shift> + 'a' |
| 5 | Control: Set Table "Upper Case" | | 26 | Key Code <shift> + 's' |
| 6 | Key Code <shift> + 'v' | | 27 | Key Code <shift> + 'f' |
| 7 | Key Code <shift> + 'u' | | 28 | Key Code '.' |
| 8 | Key Code <shift> + 'c' | | 29 | Key Code <shift> + <Left Arrow> |
| 9 | Key Code <shift> + 'y' | | 30 | Key Code <shift> + 'b' |
| 10 | Key Code <shift> + 'g' | | 31 | Key Code <shift> + 'q' |
| 11 | Control: Select Language | | 32 | Key Code <shift> + 'x' |
| 12 | Key Code <shift> + 'h' | | 33 | Key Code <shift> + 'j' |
| 13 | Key Code <shift> + 'k' | | 34 | Key Code <shift> + 'z' |
| 14 | Key Code <shift> + 'l' | | 35 | Key Code <Home> |
| 15 | Key Code <shift> + 'w' | | 36 | Key Code <Carriage Return> |
| 16 | Key Code ',' | | 37 | Key Code <Up Arrow> |
| 17 | Key Code <Down Arrow> | | 38 | Control: Null |
| 18 | Key Code <shift> + 'r' | | 39 | Key Code <Right Arrow> |
| 19 | Key Code <shift> + 'i' | | 40 | Key Code <End> |
| 20 | Key Code <shift> + 'p' | | 41 | Control: Set Table "Numerals" |

Fig. 17b

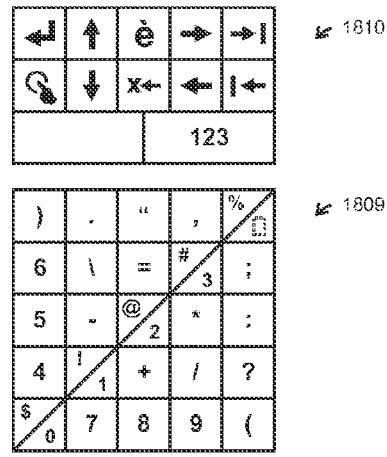

Fig. 18a

Language:English, Map:QWERTY Keycodes, Table:"Numerals"

| | | | | |
|---|---|---|---|---|
| 0 | Key Code '0' | 21 | Key Code '=' |
| 1 | Key Code '1' | 22 | Key Code <shift> + <apostrophe> |
| 2 | Key Code '2' | 23 | Character <backspace> |
| 3 | Key Code '3' | 24 | Key Code '9' |
| 4 | Key Code <space> | 25 | Key Code '/' |
| 5 | Control: Null | 26 | Key Code <shift> + '8' |
| 6 | Key Code <shift> + '4' | 27 | Key Code <shift> + '3' |
| 7 | Key Code '4' | 28 | Key Code ',' |
| 8 | Key Code '5' | 29 | Key Code <Left Arrow> |
| 9 | Key Code '6' | 30 | Key Code <shift> + '9' |
| 10 | Key Code <shift> + '0' | 31 | Key Code <shift> + '/' |
| 11 | Control: Select Language | 32 | Key Code <shift> + ';' |
| 12 | Key Code '7' | 33 | Key Code ';' |
| 13 | Key Code <shift> + '1' | 34 | Key Code <shift> + '5' |
| 14 | Key Code '-' | 35 | Key Code <Home> |
| 15 | Key Code '\' | 36 | Key Code <Carriage Return> |
| 16 | Key Code '.' | 37 | Key Code <Up Arrow> |
| 17 | Key Code <Down Arrow> | 38 | Control: Null |
| 18 | Key Code '8' | 39 | Key Code <Right Arrow> |
| 19 | Key Code <shift> + '=' | 40 | Key Code <End> |
| 20 | Key Code <shift> + '2' | 41 | Control: Toggle (Lock/Last Table) |

Fig. 18b

UNIVERSAL SCRIPT INPUT DEVICE AND METHOD

FIELD OF THE INVENTION

This invention is related to data processing devices in general and more particularly human interface means for; desktop and mobile computing devices such as cell phones, personal digital assistants, smart phones, tablet (aka pad, slate etc.) computers and the like, and public access computing devices such as email/internet kiosks, hotel and airline check-in terminals, information kiosks, vending machines, banking terminals and the like, and other computing and media devices with user controls and remote controls including televisions, media players and gaming consoles.

BACKGROUND OF THE INVENTION

Desktop, mobile and public computing devices can be broadly categorized as either telephone-like or computer-like. Telephone-like devices are characterized by their 12-button keyboard optimized for numeric input. Computer-like devices are characterized by their keyboard based on that of a classic typewriter/desktop computer, for purposes of this document referred to as a QWERTY keyboard, other key layouts and layouts for other languages are collectively included in this generic use of QWERTY. Very recently tablet computers have entered the market, however these devices fall into the computer-like category since they all employ on-screen QWERTY keyboard input for text entry.

Both telephone-like and computer-like devices share a common internal architecture; key presses are detected and subsequently internal "key press" events are generated including a code representative of the key that was pressed. Some architectures detect and report key presses and key releases as separate events. Said key press events are conveyed to a keyboard processor software function that, though a lookup table commonly know as a "keyboard map", converts each key press event to either a character or control code such as enter, tab, cursor movement etc. which is ultimately sent to the application software. Many languages follow a one-key-per-character model while other more complex languages require additional processing to achieve script input.

As is known in the art, said keyboard processor and keyboard map are part of the computing device's software. In applications where the physical keyboard device is external to the computing device, keyboard events are conveyed from said external keyboard to said computing device wherein said keyboard processor converts key press events to characters and control codes, as is known in the art.

The introduction of touch-screen technology has not changed things much, since the physical keyboard/pad has simply been replaced by an on-screen keyboard/pad. The software architecture remains the same with key press events passing from the on-screen keyboard driver to the same keyboard processor.

Computers, and the current software architectures, were initially developed in industrialized countries that predominantly used roman-based scripts, all easily supported by the QWERTY keyboard. Other regions using non-roman scripts adapted the QWERTY keyboard hardware to support text entry with increasing complexity and decreasing usability. The current state of the art is such that keyboard layouts and input methodologies for many non-roman scripts are quite inefficient and cumbersome, requiring multiple keystrokes on a full QWERTY keyboard to enter a single character, with a significant number of scripts that are not supported at all.

Mobile devices are optimized for size and power consumption, and as a trade-off their operating systems are usually optimized for small size. The current state of the art for script input on mobile devices follows one of two approaches. Low cost devices including most telephone-like devices typically support one language and one script input method. The language and script input method in some devices may be selected from a limited set by the user, or is set by the factory and may be changed only by downloading new firmware into the device. Higher cost devices, including most computer-like devices, are almost universally based on an operating system with support for multiple languages and multiple input methods. These operating systems have a great deal in common with, and several are derived from, desktop operating systems. All have a high level of integration between the input method and core operating system, which has the disadvantage of inhibiting input of scripts for which there is no input method for that particular operating system. Input methods exist for scripts required for currently served markets, however, the need to develop and integrate input methods for new scripts, for each platform, is a significant barrier to entry of new markets. Furthermore, switching input methods is achieved with varying difficulty, in all cases making it inefficient to change languages "on-the-fly". Each operating system implements a different means to select language and input method, making it impossible for a user to have any expectation of transferring input skill from one device type to another.

OBJECTS OF THE INVENTION

It is an object of this invention to provide a means for input of any script of the world on any computing device, mobile or otherwise.

It is another object of this invention for said means of script input to support any script of the world, have the capability of changing scripts "on-the-fly" with minimum effort.

It is another object of this invention for said means of script input to employ a universal means to select scripts such that any user can select a particular script on any device using the same gesture(s).

It is another object of this invention for said means of script input to support any hardware or software platform, fixed and mobile.

It is another object of this invention for said means of script input to include all essential language-specific processing in the input means, with no language-specific support required on the host platform, other than the ability to display the selected script.

It is another object of this invention to facilitate worldwide literacy by providing a minimum cost, script-independent platform suitable for primary and elementary literacy education, content creation, messaging and access to information.

It is another object of this invention to provide a means for input of commands on any computing device, mobile or otherwise.

SUMMARY OF THE INVENTION

The present invention is directed to a novel and improved computing input device and method for both fixed and mobile applications. The method is an extension of the method described by U.S. Pat. No. 7,170,430 (Goodgoll), wherein a multitude of unique inputs may be selected by gestures involving one or more fingers of one hand. As disclosed by Goodgoll, the preferred embodiment involves six sensors detecting gestures of the digits of one hand.

One physical embodiment of the present invention is a mobile universal script input device adapted to be equally usable by both left and right handed persons.

Another physical embodiment of the present invention is a literacy education device with language-independent universal script input.

One embodiment of the present invention is a universal script input device with all language-specific and/or application-specific processing performed within the device, such that the output is plain text displayable on any computing device capable of rendering the selected script.

Another embodiment of the present invention is a universal script input device with user modifiable language-specific or application-specific processing performed within the device, such that the output is plain text displayable on any computing device capable of rendering the selected script.

Another embodiment of the present invention is a universal script input device adapted to output virtual key codes, emulating a legacy keyboard, in place of, or mixed with plain text thereby providing backward compatibility with existing computing devices.

Another embodiment of the present invention is a universal script input device adapted to detect the computing device type and adapt its output to produce the same result on a multitude of computing devices with differing input methods, thereby providing for backward compatibility with existing computing devices that do not fully accommodate universal plain text input.

Another embodiment of the present invention is a universal script input device adapted to employ a universal language/script selection method such that any particular language/script is selectable on any device using the same series of gestures.

Another embodiment of the present invention is a game controller adapted to provide both conventional game controls and universal script input.

Another embodiment of the present invention is a remote control adapted to provide both conventional media or other device controls and universal script input.

It will be apparent from the forgoing general description that the objects of the invention enumerated herein, are accomplished by the invention as described. Furthermore, it will be understood that the forgoing general description and following detailed description are exemplary and explanatory of the invention but are not restrictive thereof.

BRIEF DESCRIPTION OF THE DRAWINGS

The invention will be better understood with reference to the attached drawings, in which:

FIG. 1 is a 4-view illustration of an embodiment of an ambidextrous mobile universal script input device of the present invention designed for use by either the right or left hand.

FIG. 3 is a perspective illustration of an embodiment of a universal literacy education device of the present invention incorporating ambidextrous mobile universal script input of the present invention.

FIG. 4 (prior art) is an illustration of the relationship between the digits of a hand and a grid representative of various gesture outputs.

FIGS. 5a-d (prior art) are illustrations of the relationship between gestures involving two sequential movements of one or two digits and each grid location, and assigning a symbolic name to each gesture.

FIGS. 6a-d (prior art) are illustrations of the relationship between gestures involving one extended movement of one digit and grid location, with symbolic names for each gesture, and integrated with the grid of FIG. 5d.

FIGS. 7a-d are illustrations of the relationship between gestures involving one extended movement of one digit using the sixth key, or two sequential movements of one or two digits using the sixth key, with grid locations added to represent gestures involving the sixth key including symbolic names for each gesture, integrated with the grid of FIG. 6d.

FIG. 9a is an illustration of the grid of FIG. 7d with symbolic gesture names replaced by integer indices representative of each gesture.

FIG. 9b is an illustration of the grid of FIG. 8d with symbolic gesture names replaced by integer indices representative of each gesture.

FIG. 10a is an illustration of a gesture grid layout with English lower case characters mapped to specific gestures.

FIG. 10b is an illustration of a gesture table relating each gesture index as defined in FIG. 9a to the Unicode output value corresponding to the character indicated by the grid of FIG. 104a.

FIG. 11a is an illustration of a gesture grid layout with English upper case characters mapped to specific gestures.

FIG. 11b is an illustration of a gesture table relating each gesture index as defined in FIG. 9a to the Unicode output value corresponding to the character indicated by the grid of FIG. 11a.

FIG. 12a is an illustration of a gesture grid layout with common numeric and punctuation characters mapped to specific gestures.

FIG. 12b is an illustration of a gesture table relating each gesture index as defined in FIG. 9a to the Unicode output value corresponding to the character indicated by the grid of FIG. 12a.

FIG. 13a is an illustration of a gesture grid layout with English lower case characters mapped to specific gestures, identical in layout to the grid of FIG. 10a, with common cursor control commands mapped to additional gestures.

FIG. 13b is an illustration of a gesture table relating each gesture index as defined in FIG. 0a to either the Unicode output value corresponding to the character, or a standard key code, or sequence thereof, required to produce the required cursor control command indicated by the grid of FIG. 13a.

FIG. 14a is an illustration of a gesture grid layout with English upper case characters mapped to specific gestures, identical in layout to the grid of FIG. 11a, with common cursor control commands mapped to additional gestures.

FIG. 14b is an illustration of a gesture table relating each gesture index as defined in FIG. 9a to either the Unicode output value corresponding to the character, or a standard key code, or sequence thereof, required to produce the required cursor control command indicated by the grid of FIG. 14a.

FIG. 15a is an illustration of a gesture grid layout with common numeric and punctuation characters mapped to specific gestures, identical in layout to the grid of FIG. 12a, with common cursor control commands mapped to additional gestures.

FIG. 15b is an illustration of a gesture table relating each gesture index as defined in FIG. 9a to either the Unicode output value corresponding to the character, or a standard key code, or sequence thereof, required to produce the required cursor control command indicated by the grid of FIG. 15a.

FIG. 16a is an illustration of a gesture grid layout with English lower case characters mapped to specific gestures, identical in layout to the grid of FIG. 13a.

FIG. 16b is an illustration of a gesture table relating each gesture index as defined in FIG. 9a to a standard key code, or sequence thereof, required to produce the required output character or cursor control command indicated by the grid of FIG. 16a.

FIG. 17a is an illustration of a gesture grid layout with English upper case characters mapped to specific gestures, identical in layout to the grid of FIG. 14a.

FIG. 17b is an illustration of a gesture table relating each gesture index as defined in FIG. 9a to a standard key code, or sequence thereof, required to produce the required output character or cursor control command indicated by the grid of FIG. 17a.

FIG. 18a is an illustration of a gesture grid layout with common numeric and punctuation characters mapped to specific gestures, identical in layout to the grid of FIG. 15a.

FIG. 18b is an illustration of a gesture table relating each gesture index as defined in FIG. 9a to a standard key code, or sequence thereof, required to produce the required output character or cursor control commands indicated by the grid of FIG. 18a.

DETAILED DESCRIPTION

In the following detailed description, only the portions of an otherwise conventional human interface device that relate to the present invention are illustrated and described. Although the illustrated and described embodiments are mobile and desktop human interface devices, it will be understood that the present invention is equally applicable to any type of human interface device for use with any type of computing or communication device. It will be further understood, that although the illustrated and described preferred embodiment may employ particular terminology and depictions referring to functional components, such references are illustrative and shall not be construed to be limiting in nature.

Ambidextrous Input Device

Referring to FIG. 1, which illustrates a physical embodiment 100 of the universal script input device of the present invention, equally suitable for use with the left or right hand, and supporting use with a variety of hand sizes and geometries. Pushbuttons 101 through 105 are placed symmetrically about the longitudinal axis and positioned to be actuated by the five digits of a typical human hand. Pushbutton 106 is symmetrical about the longitudinal axis and positioned to be actuated by any one of said five digits of a typical human hand without changing the position of said hand. It will be understood that while the forgoing description refers to pushbuttons, any touch or pressure sensing technology may be applied with equal effect, including without limitation, capacitive sensing, inductive sensing and resistive sensing technologies as are know in the art.

Figure 2A:
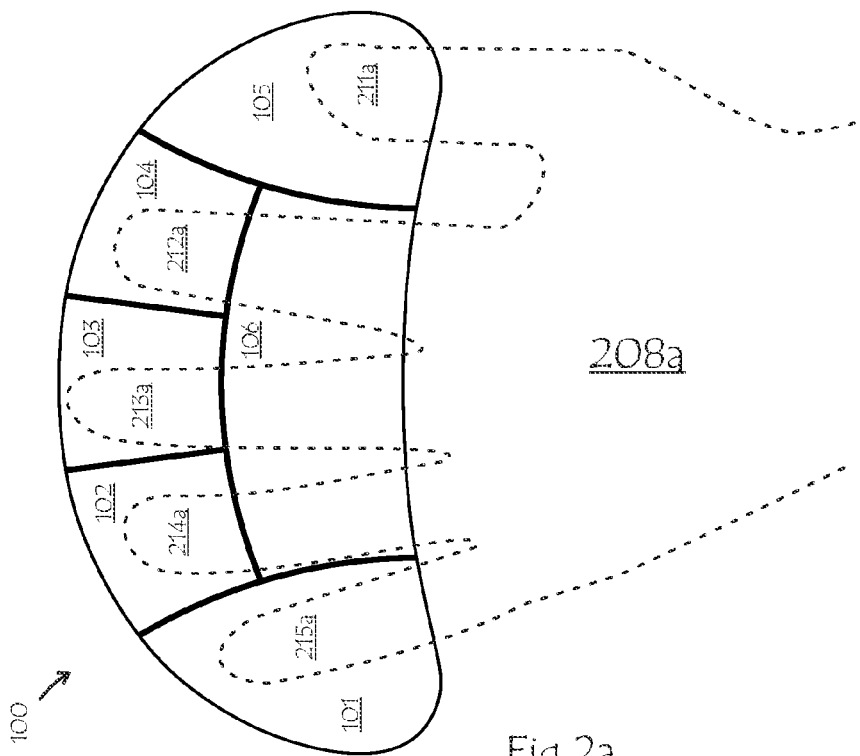
FIG. 2a is an illustration of the ambidextrous mobile universal script input device of FIG. 1 with dotted lines illustrating the placement of a user's left hand.

Now with reference also to FIG. 2a, which illustrates the ambidextrous universal script input device 100 of FIG. 1, in use by a user's left hand 208a. Pushbutton 105 detects movements of said user's thumb 211a, pushbuttons 104 through 101 detect movements of said users fingers 212a through 215a respectively.

Figure 2B:
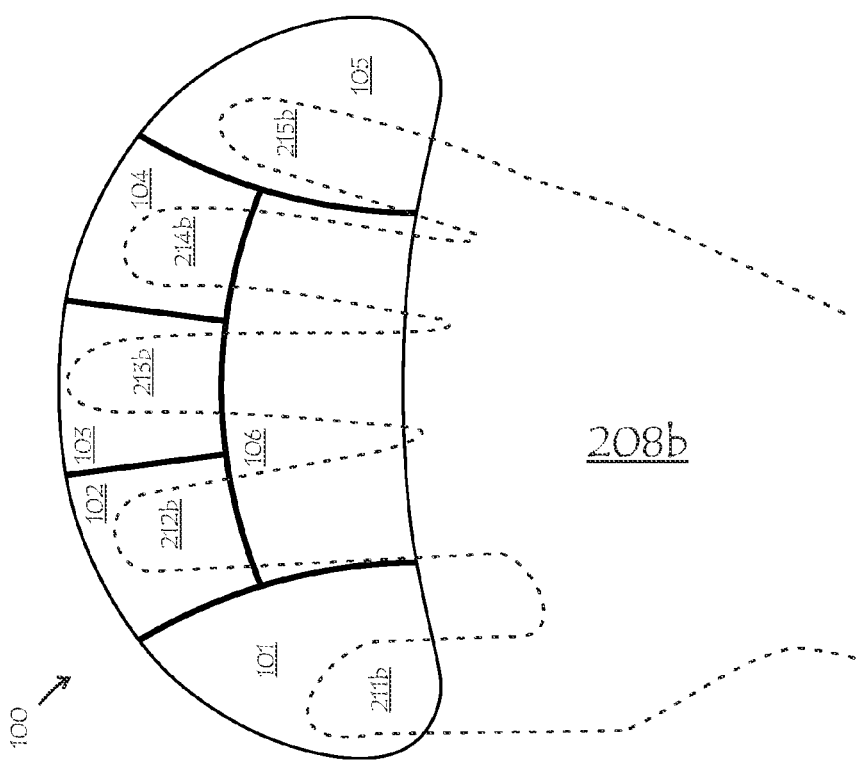
FIG. 2b is an illustration of the ambidextrous mobile universal script input device of FIG. 5 with dotted lines illustrating the placement of a user's right hand.

Now with reference also to FIG. 2b, which illustrates the ambidextrous universal script input device 100 of FIG. 1, in use by a user's right hand 208b. Pushbutton 101 detects movements of said user's thumb 211a, pushbuttons 102 through 105 detect movements of said users fingers 212b through 215b respectively.

It will be understood from the forgoing that the same universal script input device 100, may be configured for use with either the left or right hand by transposing the function of pushbuttons 101 though 105 symmetrically about the longitudinal axis of universal script input device 100. In the preferred embodiment, said configuration is achieved by software functions integral to universal script input device 100, with selection of left or right-handed operation being made by said user prior to use. Preferably, the desired said configuration is selected by pressing said user's left thumb 211a on pushbutton 105, or said user's right thumb 211b on pushbutton 101 while first turning on universal script input device 100.

Mobile Hybrid Device for Communication and Education

Referring now to FIG. 3, which illustrates a hybrid device 300 comprising a universal script input device 307 and a display 301. Said universal script input device 307 is of an ambidextrous design, similar to that described in FIG. 1 and FIG. 1, comprising pushbuttons 301-306. A microprocessor (not shown) preferably implements the gesture input method described in U.S. Pat. No. 7,170,430 (Goodgoll), and manages display 301 as controlled by downloadable application software (not shown). Device 300 also preferably includes an audio output means suitable for playback of music, human voice and the like. Preferably, a local non-volatile memory (not shown) provides data storage of said downloadable application software, text and media files, as well as user-created content, and a short-range RF communication link such as 802.15.4, 802.11 (WiFi), or the like, which provides means for upload and download of said application software, text and media files and user-created content. Said application software is preferably designed for literacy and communication applications with means for viewing e-books, administering exercises in mathematics, vocabulary, composition and the like, question-and-answer quizzes, and means for creating user-generated content (i.e. essays, short stories etc.) using both human voice prompts, for entry-level students that lack the adequate reading skills, and graphic/text presentation or both. Preferably, said short-range RF communication link and said application software is adapted to provide for person-to-person messaging over short range directly between a plurality of devices 300. Said person-to-person messaging capability intended to encouraging messaging for entertainment between users with the side-effect of increasing literacy though regular use.

Graphic and Symbolic Representation of Gestures

Referring now to FIG. 4, which is a graphic representation of a grid 409, with columns C1-C5 corresponding to a first push of thumb 411 or one of fingers 412-415 respectively, and rows R1-R5 corresponding to a second push of thumb 411 or one of fingers 412-415 respectively, as is known in the art. Each combination of presses of any two fingers, or two presses of the same finger, corresponds to a particular cell in the grid, as is known in the art. It will be understood that although grid 409 is representative of gestures made with the right hand 408a/408b, a grid for the left hand will have columns C1-C5 mirrored around the vertical axis corresponding to the mirrored physical arrangement of the left hand.

Now with reference to FIG. 5a, a gesture involving a press of button 501 followed by a second press of button 501, as represented by arrow 511, may be assigned the symbolic name "11", representative of the two presses of button 501, said symbolic name being placed in grid 509a in the cell at the intersection of column C1 and row R1. Now with reference to FIG. 5b, a gesture involving a press of button 502 followed by a press of button 501, as represented by arrow 521, may be assigned the symbolic name "21", representative of the sequence of said presses of button 502 and 501, said symbolic name being placed in grid 509b in the cell at the intersection of column C2 and row R1. Now with reference to FIG. 5c, a gesture involving a press of button 502 followed by a press of button 504, as represented by arrow 524, may be assigned the symbolic name "24", representative of the sequence of said presses of button 502 and 504, said symbolic name being placed in grid 509c in the cell at the intersection of column C2 and row R4. With reference to FIGS. 5a through 5d, it will be understood that by following the pattern described, with the column corresponding to the first button pressed and the row corresponding to the second button pressed, each cell in grid 509d may be assigned a symbolic name corresponding to the sequence of two presses of any combination of two keys 501 through 505, as illustrated.

Now with reference to FIG. 6a, a gesture involving an extended press of button 601 longer than a predetermined interval, as represented by dot 61, may be assigned the symbolic name "1", representative of said single extended press of button 601, said symbolic name being placed in grid 609a in the cell at the intersection of column C1 and row R1. Now with reference to FIG. 6b, a gesture involving an extended press of button 602 longer than a predetermined interval, as represented by dot 62, may be assigned the symbolic name "2", representative of said single extended press of button 602, said symbolic name being placed in grid 609b in the cell at the intersection of column C2 and row R2. With reference to FIGS. 6a through 6c, it will be understood that by following the pattern described, cells at the intersection of each row and the similarly numbered column in grid 609c may be assigned a symbolic name corresponding to said extended press of keys 601 through 605, as illustrated. Now with reference to FIGS. 5d, 6c and 6d, it will be understood that grid 509d may be combined with grid 609c by adding diagonal line 670, and placing said symbolic names from grid 609c within the same respective cells but below diagonal line 670, and said symbolic names from grid 509*d* within the same respective cells but above diagonal line 670 in the cells intersected by said diagonal line.

Now with reference to FIG. 7*a*, a gesture involving a press of button 701 followed by a press of button 706, as represented by arrow 716, may be assigned the symbolic name "16", representative of the sequence of said presses of button 701 and 706, said symbolic name being placed in grid 710*a* in the cell at the intersection of column C1 and row R7. Now with reference to FIG. 7*b*, a gesture involving a press of button 706 followed by a press of button 701, as represented by arrow 761, may be assigned the symbolic name "61", representative of the sequence of said presses of button 706 and 701, said symbolic name being placed in grid 710*b* in the cell at the intersection of column C1 and row R8. Now with reference to FIG. 7*c*, a gesture involving a press of button 706 followed by a second press of button 706, as represented by arrow 766, may be assigned the symbolic name "66", representative of the two presses of button 706, said symbolic name being placed in grid 710*c* in the rightmost cell of row R6. Still with reference to FIG. 7*c*, a gesture involving an extended press of button 706 longer than a predetermined interval, as represented by dot 76, may be assigned the symbolic name "6", representative of said single extended press of button 706, said symbolic name being placed in grid 710*a* in the leftmost cell of row R6. With reference to FIGS. 7*a* through 7*d*, it will be understood that by following the pattern described, each cell in grid 710*d* may be assigned a symbolic name corresponding to the sequence of two presses of any key 501 through 506 in combination with key 506, as illustrated. Now with reference to FIGS. 6*d* and 7*d*, it will be understood that grid 609*d* (709*d* in FIG. 7*d*) may be combined with grid 710*d* as illustrated.

Figure 8A:
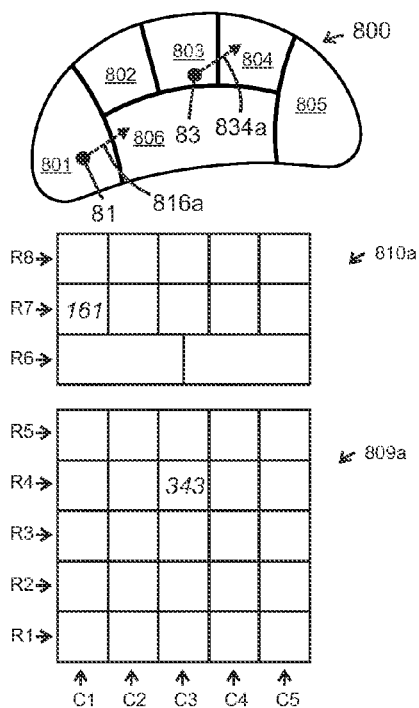
FIGS. 8a-d are illustrations of the relationship between extended gestures involving two sequential movements of one or two digits coupled with an extended movement of one of the same digits, with symbolic names for each gesture, and integrated with the grid of FIG. 7d.

Now with reference to FIG. 8*a*, a gesture involving a press of button 701 followed by a press of button 706, as represented by arrow 716, may be assigned the symbolic name "16", representative of the sequence of said presses of button 701 and 706, said symbolic name being placed in grid 710*a* in the cell at the intersection of column C1 and row R7. Now with reference to FIG. 7*b*, a gesture involving a press of button 706 followed by a press of button 701, as represented by arrow 761, may be assigned the symbolic name "61", representative of the sequence of said presses of button 706 and 701, said symbolic name being placed in grid 710*b* in the cell at the intersection of column C1 and row R8. Now with reference to FIG. 7*c*, a gesture involving a press of button 706 followed by a second press of button 706, as represented by arrow 766, may be assigned the symbolic name "66", representative of the two presses of button 706, said symbolic name being placed in grid 710*c* in the rightmost cell of row R6. Still with reference to FIG. 7*c*, a gesture involving an extended press of button 706 longer than a predetermined interval, as represented by dot 76, may be assigned the symbolic name "6", representative of said single extended press of button 706, said symbolic name being placed in grid 710*a* in the leftmost cell of row R6. With reference to FIGS. 7*a* through 7*d*, it will be understood that by following the pattern described, with cells in row R7 corresponding to sequential presses of the key corresponding to the column followed by a press of key 706 and cells in row R8 corresponding to sequential presses of key 706 followed by a press of the key corresponding to the column, each cell in grid 710*d* may be assigned a symbolic name corresponding to the sequence of two presses of any key 501 through 506 in combination with key 506, as illustrated. Now with reference to FIGS. 6*d* and 7*d*, it will be understood that grid 609*d* (709*d* in FIG. 7*d*) may be combined with grid 710*d* as illustrated.

Now with reference to FIG. 8*a*, a hybrid gesture consisting of a press of button 801 followed by a press of button 806, as indicated by arrow 816*a*, combined with an extended press of button 801, as indicated by dot 81, may be assigned the symbolic name 161, representative of said sequential press of button 801 followed by button 806 combined with said extended press of button 801, said symbolic name being placed in row R7 column C1 following the previously described rule of the column corresponding to the first pressed key, and the row corresponding to the second pressed key. Still with reference to FIG. 8*a*, a hybrid gesture consisting of a press of button 803 followed by a press of button 804, as indicated by arrow 834*a*, combined with an extended press of button 803, as indicated by dot 83, may be assigned the symbolic name 343, representative of said sequential press of button 803 followed by button 804 combined with said extended press of button 803, said symbolic name being placed in row R4 column C3 following the previously described rule of the column corresponding to the first pressed key, and the row corresponding to the second pressed key.

Figure 8B:
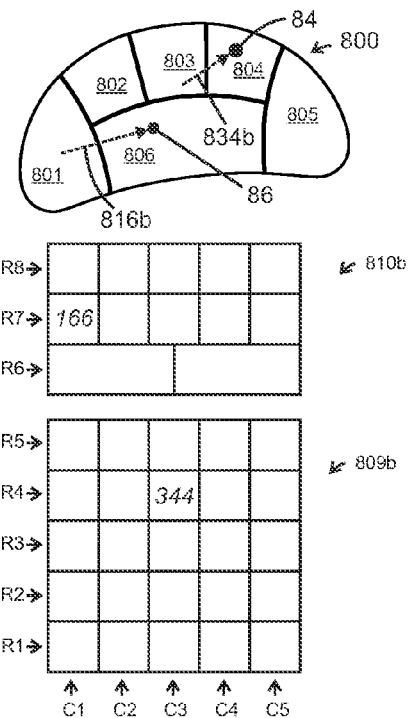

Now with reference to FIG. 8*b*, a hybrid gesture consisting of a press of button 801 followed by a press of button 806, as indicated by arrow 816*b*, combined with an extended press of button 806, as indicated by dot 86, may be assigned the symbolic name 166, representative of said sequential press of button 801 followed by button 806 combined with said extended press of button 806, said symbolic name being placed in row R7 column C1 following the previously described rule of the column corresponding to the first pressed key, and the row corresponding to the second pressed key. Still with reference to FIG. 8*b*, a hybrid gesture consisting of a press of button 803 followed by a press of button 804, as indicated by arrow 834*b*, combined with an extended press of button 804, as indicated by dot 84, may be assigned the symbolic name 344, representative of said sequential press of button 803 followed by button 804 combined with said extended press of button 804, said symbolic name being placed in row R4 column C3 following the previously described rule of the column corresponding to the first pressed key, and the row corresponding to the second pressed key.

Figure 8C:
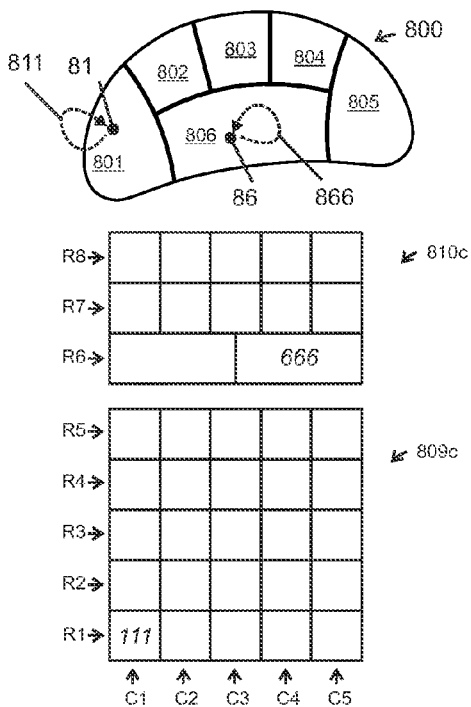

Now with reference to FIG. 8*c*, a hybrid gesture consisting of a press of button 801 followed by a second press of button 801, as indicated by arrow 811, combined with an extended press of button 801 executed by holding said second press of button 801, as indicated by dot 81, may be assigned the symbolic name 111, representative of said two presses of button 801 combined with said extended press of button 801, said symbolic name being placed in row R1 column C1 following the previously described rule of the column corresponding to the first pressed key, and the row corresponding to the second pressed key. Still with reference to FIG. 8*c*, a hybrid gesture consisting of a press of button 806 followed by a second press of button 806, as indicated by arrow 866, combined with an extended press of button 806 executed by holding said second press of button 806, as indicated by dot 86, may be assigned the symbolic name 666, representative of said two presses of button 806 combined with said extended press of button 806, said symbolic name being placed in the rightmost cell of row R6 following the previously described rule.

Figure 8D:
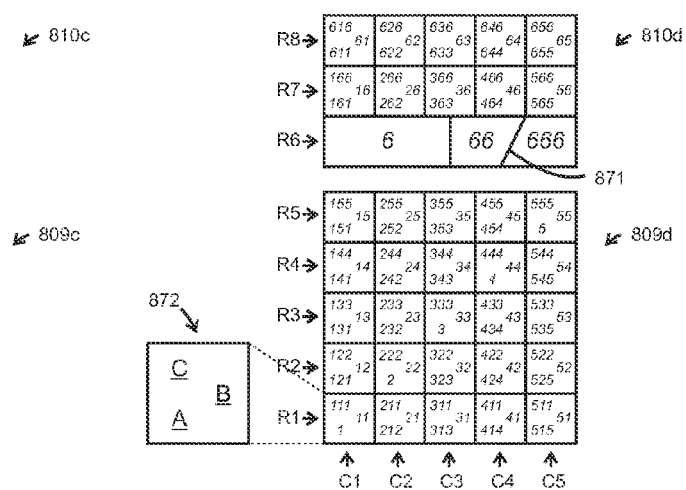

Now with reference to FIG. 7*d* and FIGS. 8*a*-8*d*, it will be understood that grid 709*d* and grid 710*d* representing basic 2-key sequential and single long presses may be enhanced as illustrated in FIG. 8d to include all hybrid gestures combining sequential and extended gestures. Each cell in rows R1 though R5 and R7 and R8 of grids 8109d and 810d, contains three symbolic names positioned as illustrated in detail 872. For all cells in said rows except the diagonal cells from R1 C1 to R5 C5, the symbolic name in position B represents the basic sequential gesture in the same relative cell of grids 709d and 710d, the symbolic name in position A represents the hybrid gesture combining said basic sequential gesture and an extended press of the first key of said basic sequential gesture, and the symbolic name in position C represents the hybrid gesture combining said basic sequential gesture and an extended press of the second key of said basic sequential gesture. For all diagonal cells from R1 C1 to R5 C5 in grid 809d, the symbolic name in position B is the symbolic name of the basic sequential gesture in the upper half of the same relative cell of grids 709d and 710d, the symbolic name in position A is the symbolic name of the basic extended gesture in the lower half of the same relative cell of grids 709d and 710d, and the symbolic name in position C represents the hybrid gesture combining said basic sequential gesture and an extended press of the same key of said basic sequential gesture. Row R6 of grid 810d contains two cells with the leftmost cell containing the symbolic name representing the basic extended gesture of the same cell in grid 710d, the rightmost cell is divided by line 871 with the symbolic name to the left of line 871 representing the basic sequential gesture of the same cell in grid 710d, and the symbolic name to the right of line 871 representing the hybrid gesture combining said basic sequential gesture and an extended press of the same key of said basic sequential gesture.

Figures 9A, 9B:
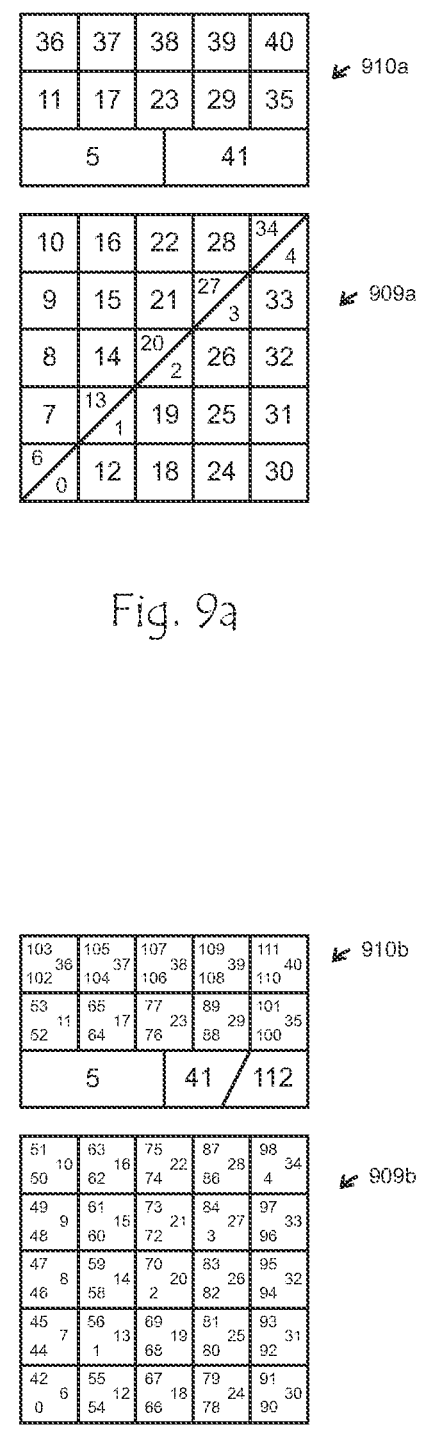

Now with reference to FIG. 7d and FIG. 9a, said symbolic names for each gesture represented in grids 709d and 710d may be replaced by a corresponding numerical index as illustrated in FIG. 9a, said numerical index having greater utility than said symbolic name within computer software applications.

Now with reference to FIG. 8d and FIG. 9b, said symbolic names for each gesture represented in grids 809d and 810d may be replaced by a corresponding numerical index as illustrated in FIG. 9b, said numerical index having greater utility than said symbolic name within computer software applications.

It will be understood from the forgoing that each basic sequential and extended gesture may be represented visually on a grid, symbolically and numerically. It will also be understood from the forgoing that each basic sequential, extended and hybrid gesture may be represented visually on a grid, symbolically and numerically.

Gesture-to-Language Mapping

With reference to FIGS. 7d, 9a and 10a and 10b, an embodiment of the present invention applied to the English language will be described. For selected gesture represented by symbolic names in grids 709d and 710d, a Unicode character is assigned replacing said symbolic name with the actual character in grids 1009 and 1010. For other selected gestures represented by symbolic names in grids 709d and 710d, an internal control code, as will be described, is assigned replacing said symbolic name with an icon representing the function of said control code in grids 1009 and 1010. It will be understood that grids 1009 and 1010 are a visual representation of the correlation between each said gesture and one said Unicode characters or control function. FIG. 10b is a representation of a lookup table corresponding to the language-specific gesture mapping of FIG. 10a, wherein each position in said table referenced by the index from FIG. 9a corresponding to each gesture contains a Unicode character, an internal control code or Null if the corresponding gesture is not assigned a character or function. It will be understood that FIG. 10a provides a visual reference for a user to determine the gesture corresponding to a specific character or function, and that the table in FIG. 10b provides for rapid lookup of the character on control function corresponding to a particular gesture. It will be further understood that the table in FIG. 10b may be represented in a variety of ways as needed for a specific application including encoding for use by computer software as is known in the art. It will be further understood that said Unicode characters have universal application and are not specific to any particular device or operating system, as is known in the art. It will also be understood that while the embodiment illustrated in FIGS. 10a and 10b conform to the general structure of FIG. 9a with 42 discrete gesture codes, an alternative embodiment based on FIG. 9b, with 113 discrete gesture codes could be applied where required for a particular language or application.

Now also with reference to FIGS. 11a and 11b, which represent a second grid and lookup table similar to that in FIGS. 10a and 10b, except with English upper case characters in place of the corresponding lower case characters. It will be understood from the forgoing that by selecting between a first and second table, as will be described, a user may select between lower and upper case characters.

Now also with reference to FIGS. 12a and 12b, which represent a third grid and lookup table populated with numerals and punctuation characters. It will be understood from the forgoing that by selecting between a first and second table, as will be described, a user may select between entry of characters and numerals and other characters. It will be further understood that while the described embodiment provides for selecting between upper and lower case versions of the same character, and between characters and numerals or punctuation marks, it is equally possible to select between any number of sets of any characters or symbols.

Unicode Characters with System-Specific Key Codes

Now also with reference to FIGS. 13a, 13b, 14a, 14b, 15a and 15b, which represent an expanded embodiment similar to that illustrated in FIGS. 10-12, with the addition of key scan codes, known in the art, for commonly used navigation keys. Said key scan codes may be target-specific to the device receiving user interactions, or may comply with a standard set of key codes such as defined by the USB specification, as is known in the art. Said navigation keys are not characters, are not included in the Unicode character set, and represent user interactions other than text entry. It will be understood from the forgoing that the present invention provides for user interactions involving entry of text and interactions other than text entry, and both said interactions may coexist in the same table.

System-Specific Key Code Input

Now also with reference to FIGS. 16a, 16b, 17a, 17b, 18a and 18b, which represent an alternative embodiment similar to that illustrated in FIGS. 13-15, with text input gestures mapped to key scan codes in place of Unicode characters. Said key scan codes may be target-specific to the device receiving user text input and navigation commands, or may comply with a standard set of key codes such as defined by the USB specification, as is known in the art. It will be understood that the described use of key scan codes is consistent with present-art keyboard input, and therefore provides for backward-compatibility with existing systems. It will be further understood from the forgoing that the present invention provides for user interactions involving entry of text using Unicode characters, or key san codes as well as interactions other than text entry, and all said interactions may coexist in the same table.

Universal Script Input Device Logical Structure

Figure 19:
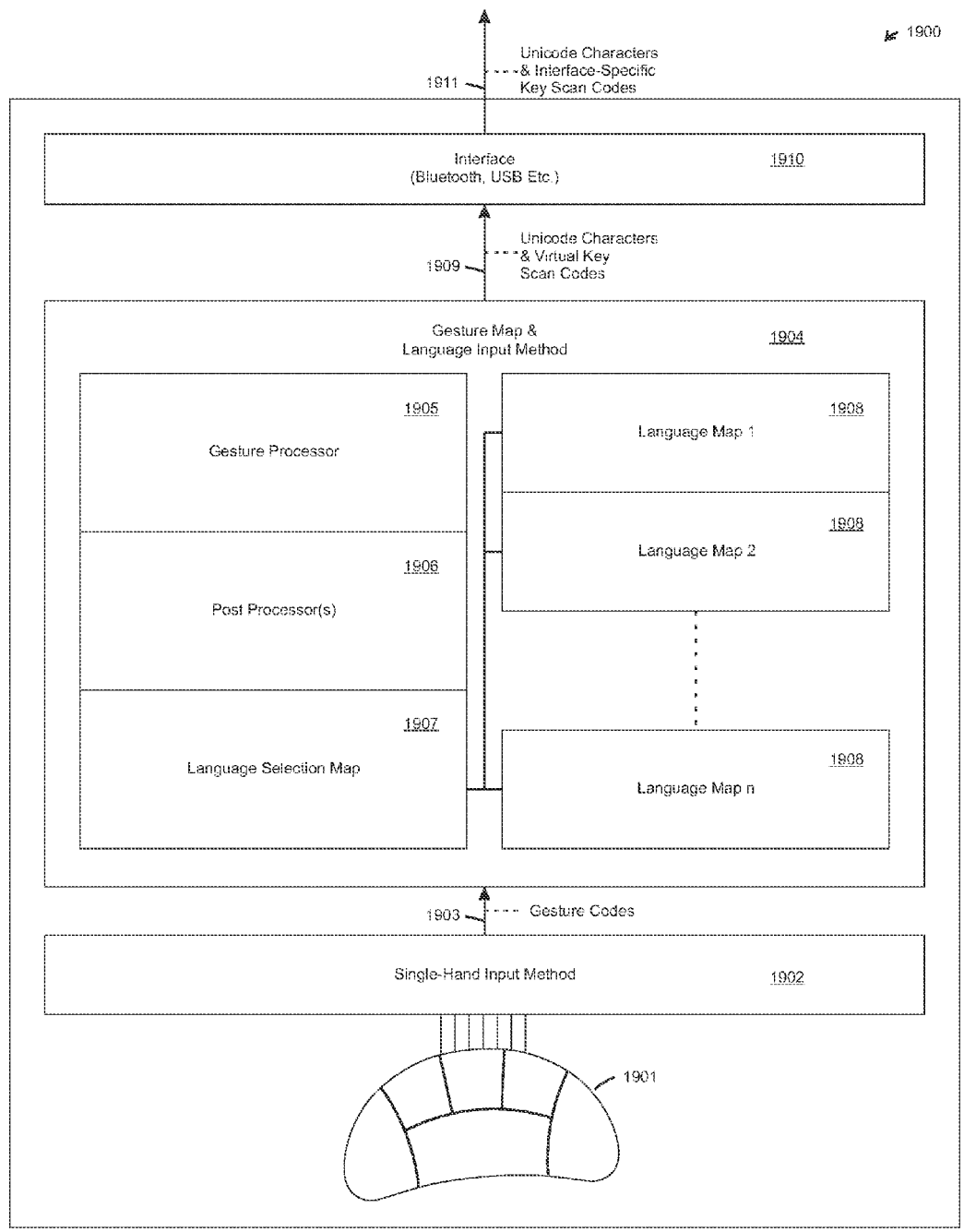
FIG. 19 is a block diagram of an embodiment of the universal script input device of the present invention.

Referring now to FIG. 19, which is a functional block diagram of an embodiment of a universal script input device of the present invention, gesture sensor 1901 is preferably implemented as a 6-button ambidextrous keyboard. Movements of the fingers of the user's hand (not shown) are sensed by said gesture sensor, and conveyed to single hand input method 1902, which analyzes said finger movements and outputs gesture codes 1903, which preferably are gesture indices as previously described in relation to FIGS. 9a and 9b. Gesture codes 1903 are conveyed to gesture map and input method 1904, wherein said gesture codes are processed, producing output comprising Unicode characters and virtual key scan codes 1909, as will be described. Virtual key scan codes 1909 preferably are the standard key scan codes defined by the USB specification HID profile. Said Unicode characters and key scan codes are conveyed to interface 1910, which conveys the same to an external system (not shown). Interface 1910 preferably complies with the Bluetooth standard, but it will be understood that any interface may be applied equally. Without limitation, interface 1910 may comply with any open standard such as USB, or any proprietary standard such as the IBM PS2 keyboard standard. In cases where interface 1910 complies with a standard other than Bluetooth or USB, or said virtual key scan codes do not comply with the USB HID specification, interface 1910 converts said virtual key scan codes to the corresponding interface-specific key scan code. It will be understood from the forgoing, that the same gesture map and input method 1904 may be used with different interfaces 1910 without change. It will be further understood that virtual key scan codes may comply with any standard, or be arbitrarily assigned, providing that said gesture map and input method and said interface utilize the same set of virtual key scan codes. Furthermore, it will be understood that while the forgoing description collectively refers to Unicode characters and virtual key scan codes 1909 and Unicode characters and Interface-specific key scan codes 1911, either may comprise only Unicode characters or only key scan codes or both. I will also be understood that while gesture sensor 1901 is described as a 6-button keyboard, it may be any sensor capable of detecting discrete movements of the digits of one hand, with equal utility.

Still with reference to FIG. 19, gesture map and language input method 1904 will be described in greater detail. Gesture processor 1905 processes gesture codes 1903 producing output comprising Unicode characters and virtual key scan codes 1909, according to language-specific configuration data of the presently selected of a plurality of language maps 1908, and as configured by said language-specific configuration data, by one or more post processors 1906. Subject to said language-specific configuration data, each gesture may result in the output of; nothing, a single Unicode character, a single virtual key scan code, a plurality of Unicode characters, a plurality of virtual key scan codes, or a plurality of outputs comprising Unicode characters and virtual key scan codes. As will be described, selection of a specific language for input is initiated by the user executing a predetermined language selection gesture, which preferably causes gesture map and language input method 1904 to interpret one subsequent gesture code according to language selection map 1907, which preferably selects a different language map 1908 for subsequent use. Preferably, language selection map 1907 is similar to the grid in FIGS. 7d and 9a, but with language specifiers instead of characters assigned to each gesture. Furthermore, language selection map 1907 is preferably uniform across all embodiments such that each language has a single, common, selection gesture. Preferably, Language selection map 1907, and language maps 1908 are configurable and may be field-updated to change the set of languages available, or to modify the organization of a language map to accommodate personal preference or improvements, or to add user-defined language maps. It will be understood from the forgoing that while language maps 1908 have been described as relating to input of a specific language, they may equally relate to other uses such as generating software-specific commands in response to gestural input, furthermore said software-specific commands may be configured to be compatible with existing software applications by assigning selected gestures to produce sequences of virtual key scan codes compatible with existing keyboard shortcuts of said software applications, as are know in the art. It will be further understood that said software-specific commands may be configured to be compatible with embedded software applications including, without limitation, remote controls for media players and gaming controls that may not be readily apparent to the user as software applications.

Figure 20:
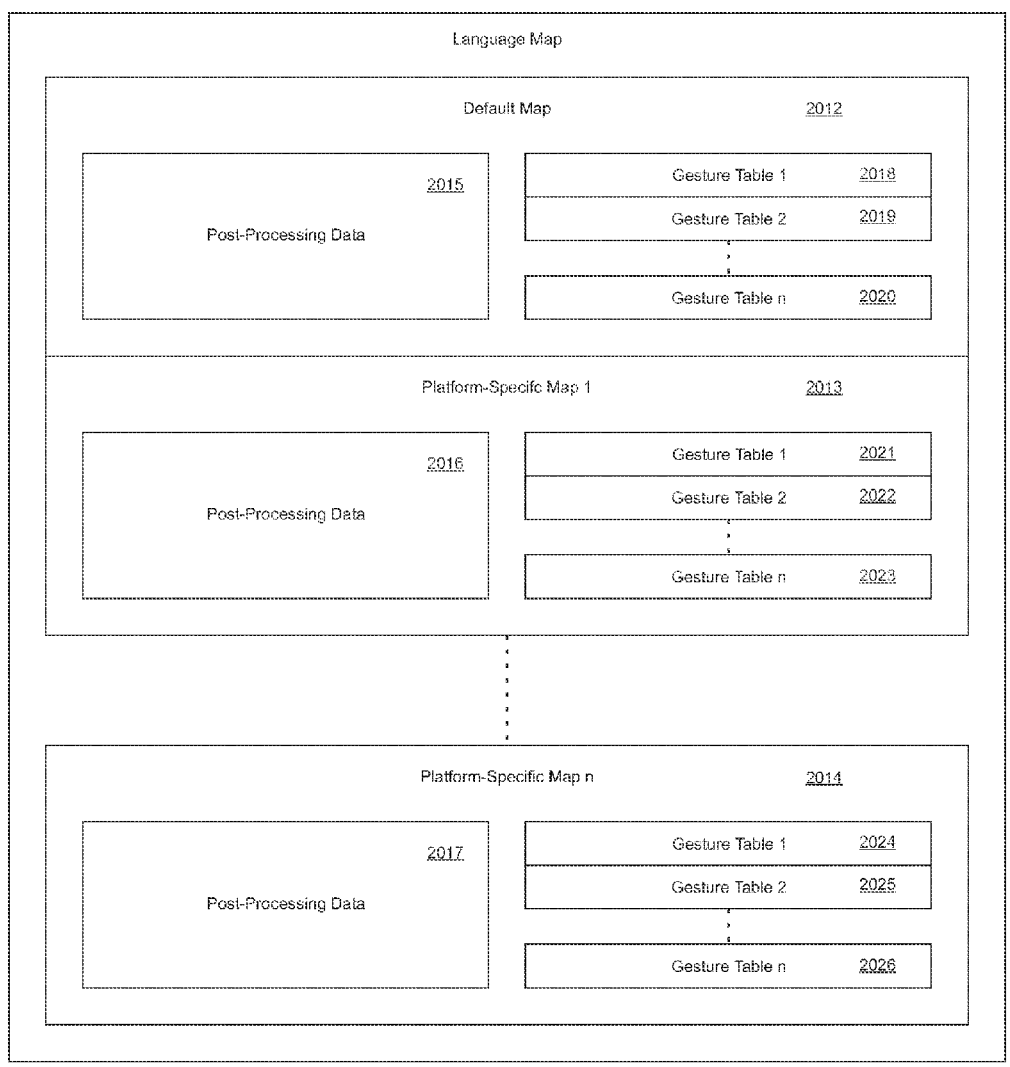
FIG. 20 is a more detailed block diagram of the Language Map block in FIG. 19.

Now with reference also to FIG. 20, language map 2008, a more detailed depiction of language map 1908 will be described. Language map 2008 preferably comprises at least default map 2012, and as required, any number of platform-specific maps 2013, 2014. Each said map comprises post-processing configuration data 2015, 2016 and 2017, at least one gesture table 2018, 2021 and 2024, and as required, additional gesture tables 2019, 2020, 2022, 2023, 2025 and 2026. Each said gesture table preferably conforms to the general structure of FIG. 10b, with differences in the particular Unicode character, key code or control code assigned to each gesture as required. Platform-specific maps 2013, 2014, preferably are employed where a specific data processing platform requires differences in the output Unicode characters or key codes in order to produce the intended result. It will be understood that, as is known in the art, many computing platforms that cannot accept Unicode characters and can only accept key code input, and since many said computing platforms differ in the keystrokes required to produce certain outputs, said platform-specific maps provide means for the universal script input device of the present invention to produce output tailored for each said computing platform.

Platform-specific Operation

Figure 21:
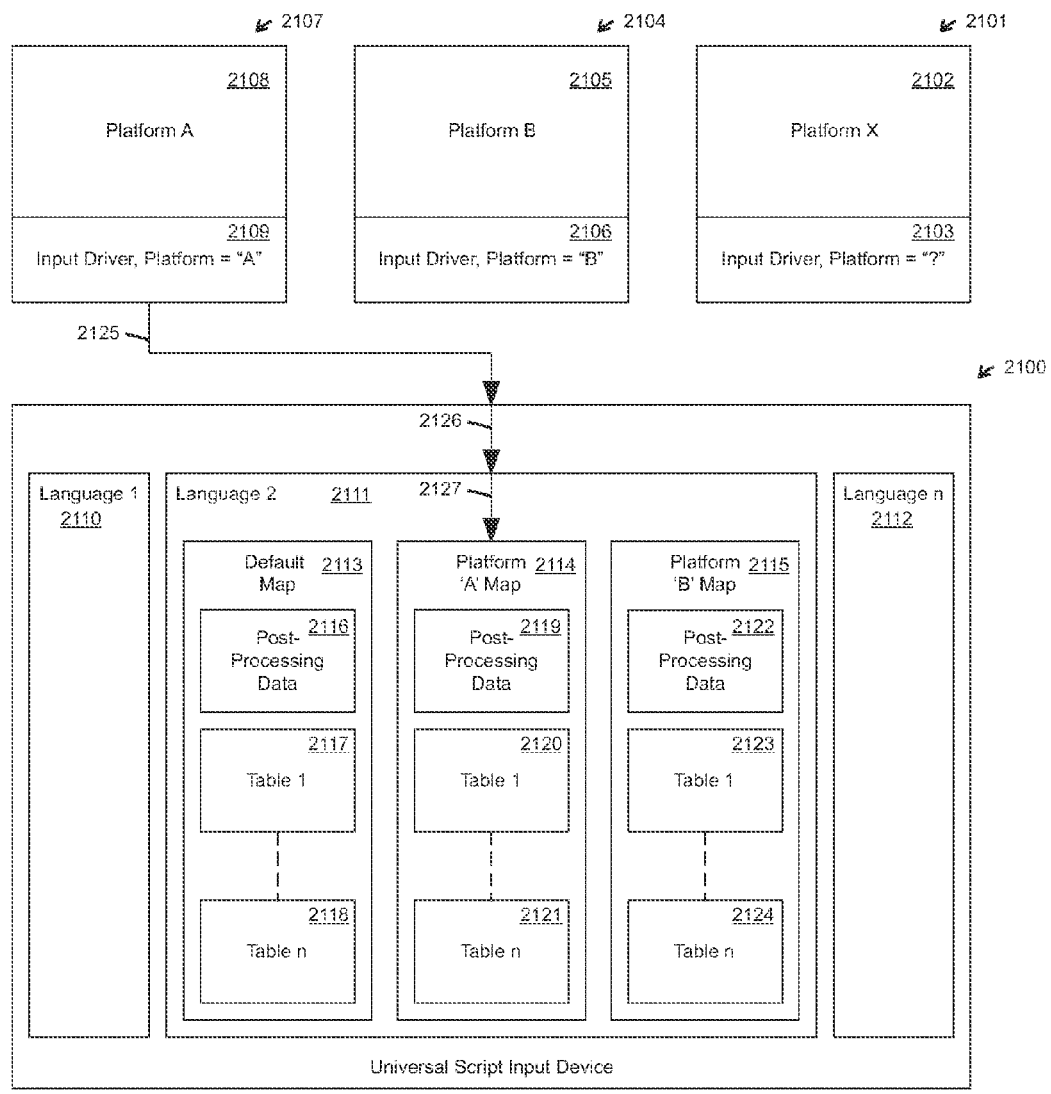
FIG. 21 is a block diagram representative of an embodiment of the universal script input device of the present invention and three different computing devices connectable thereto, illustrating operation with interconnection between Hardware Platform A.

Referring now to FIG. 21, which represents a universal script input device 2100 of the present invention, connectable to one of a plurality of computing devices 2107, 2104, 2101, aspects of the present invention related to platform-specific operation will be described. Each said computing device comprises platform 2102, 2105, 2108 consisting of hardware and software elements with varying functional characteristics, and input driver 2103, 2106, 2109 that provides connectivity to universal script input device 2100 via interface 2125. It will be understood that interface 2125 may be any means of interconnection between computing devices, including without limitation USB and Bluetooth, as appropriate. Universal script input device 2100 comprises a plurality of language maps 2110, 2111, 2112 as has been described, and language map 2111 comprises default map 2113 and platform-specific maps 2114, 2115, as have been described. Each map 2113, 2114, 2115 comprises post-processing configuration data 2116, 2119, 2122 and a plurality of gesture tables 2117, 2118, 2120, 2121, 2123, 2124 as has been described. Each said map configured to produce the same intended output on a selected one of a plurality of computing platforms as has been described.

Still with reference to FIG. 21, computing device 2107, is presently connected to universal script input device 2100 via interface 2125, and language map 2111 is presently selected as illustrated by arrow 2126. Input driver 2109 conveys platform type information "A" to universal script input device 2100, which subsequently selects matching platform map 2114 within language map 2111 as illustrated by arrow 2127. Subsequent gestural input by the user (not shown), is processed according to platform map 2114 producing output comprising Unicode characters and key codes according to said platform map, which are conveyed to computing device 2107, producing the corresponding script output.

Figure 22:
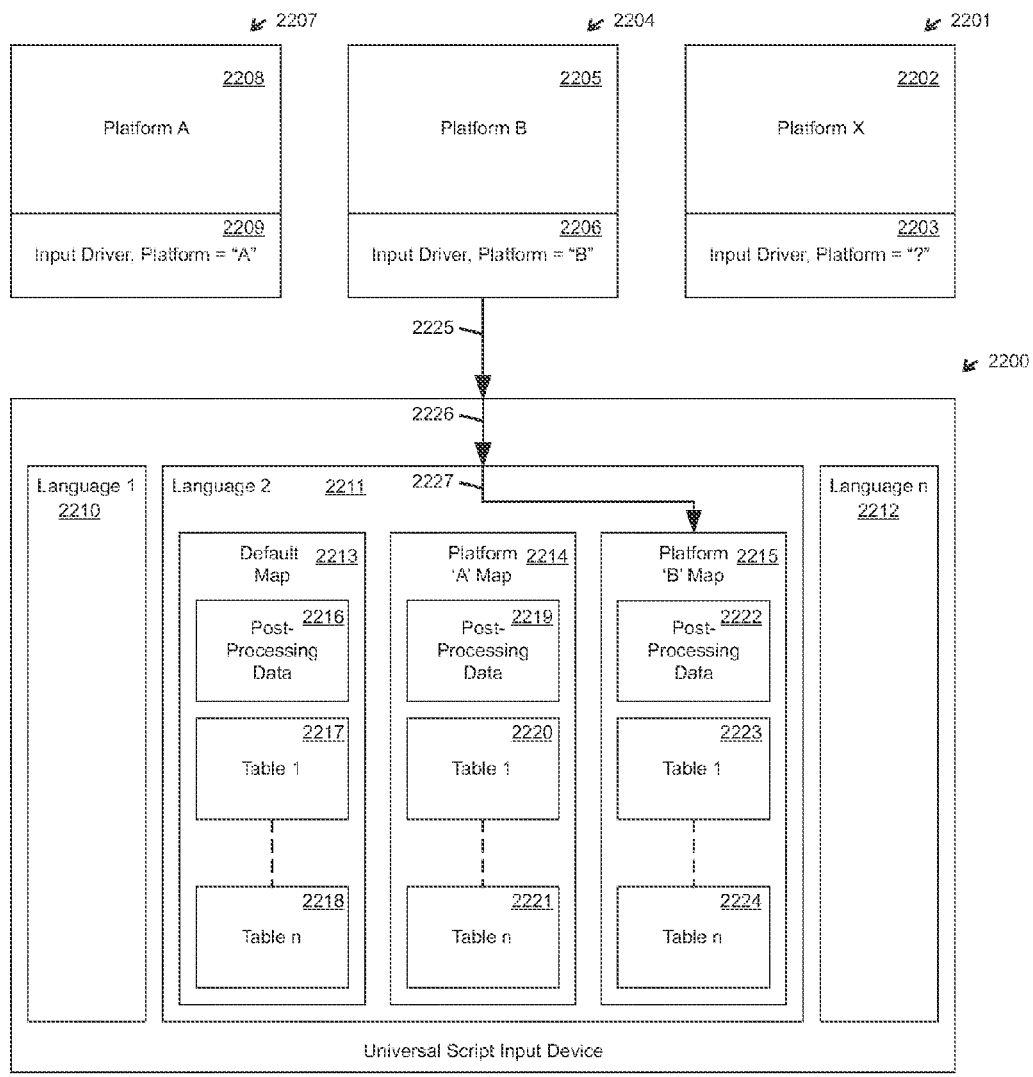
FIG. 22 is a block diagram representative of an embodiment of the universal script input device of the present invention and three different computing devices connectable thereto, illustrating operation with interconnection between Hardware Platform B.

Now with reference also to FIG. 22, which is a representation of the same system depicted in FIG. 21, computing device 2205, is presently connected to universal script input device 2200 via interface 2225, and language map 2211 is presently selected as illustrated by arrow 2226. Input driver 2206 conveys platform type information "B" to universal script input device 2200, which subsequently selects matching platform map 2215 within language map 2211 as illustrated by arrow 2227. Subsequent gestural input by the user (not shown), is processed according to platform map 2215 producing output comprising Unicode characters and key codes according to said platform map, which are conveyed to computing device 2205, producing the corresponding script output. It will be understood that said output comprising Unicode characters and key codes may differ from the output previously described with reference to FIG. 21, said differences necessary to accommodate said variances in functional characteristics of computing platforms 2205, 2108, and produce the same script output on each said computing platform.

Figure 23:
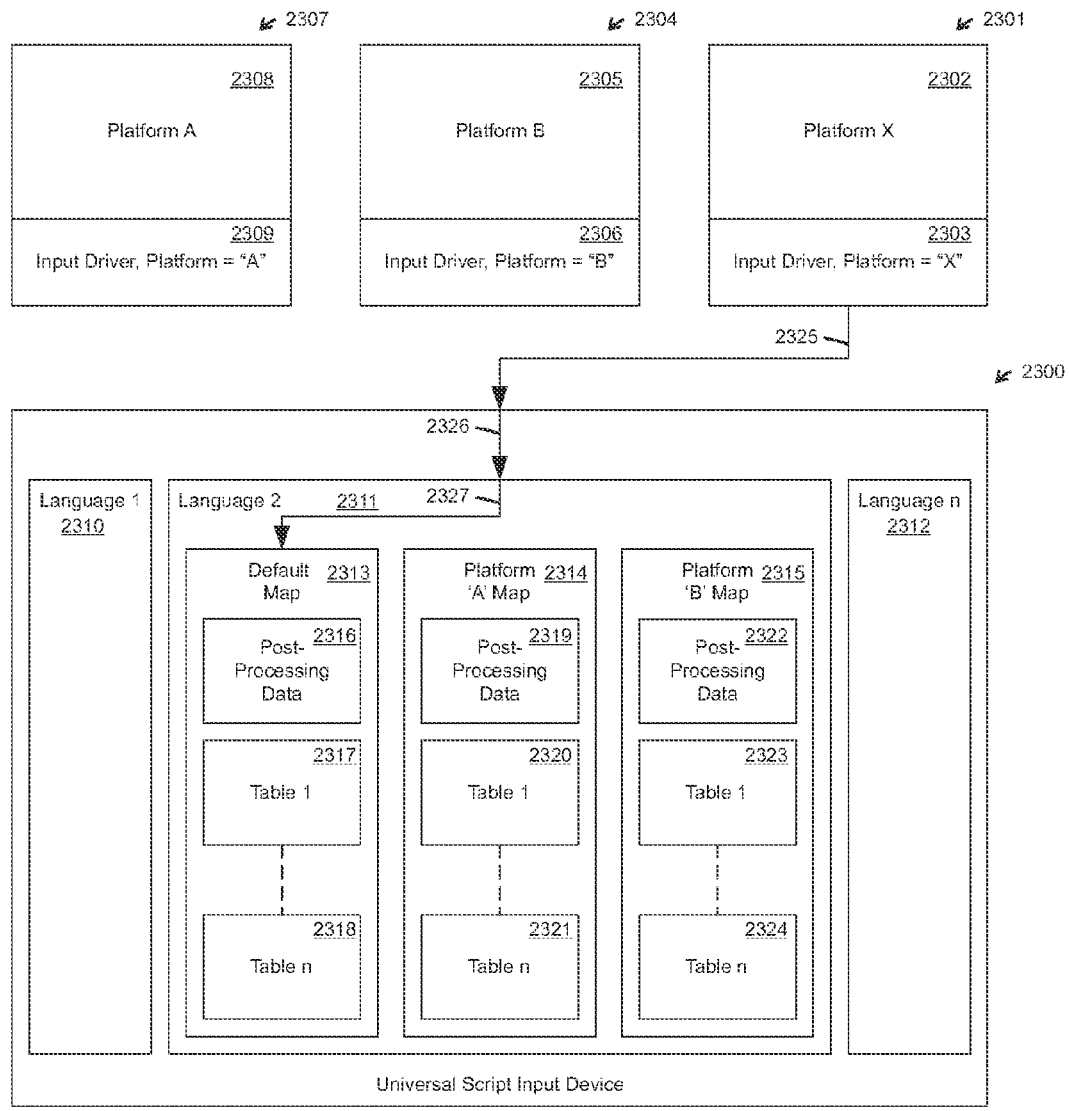
FIG. 23 is a block diagram representative of an embodiment of the universal script input device of the present invention and three different computing devices connectable thereto, illustrating operation with interconnection between Hardware Platform X.

Now with reference also to FIG. 23, which is a representation of the same system depicted in FIGS. 21 and 22, computing device 2302, is presently connected to universal script input device 2300 via interface 2325, and language map 2311 is presently selected as illustrated by arrow 2326. Input driver 2303 conveys platform type information "X" to universal script input device 2300 which, not finding a matching platform map, subsequently selects default map 2313 within language map 2311 as illustrated by arrow 2327. Subsequent gestural input by the user (not shown), is processed according to platform map 2313 producing output comprising Unicode characters and key codes according to said platform map, which are conveyed to computing device 2302, producing the corresponding script output. It will be understood that said output comprising Unicode characters and key codes consists of only Unicode characters and generic navigation key codes, and produce the same script output on each said computing platform capable of accepting Unicode characters. It will be further understood that computing device platforms that can accept standard Unicode script input and have no platform-specific requirements, may intentionally select said generic platform map by sending predetermined platform type information.

Integration with Computing Platforms

Figure 24:
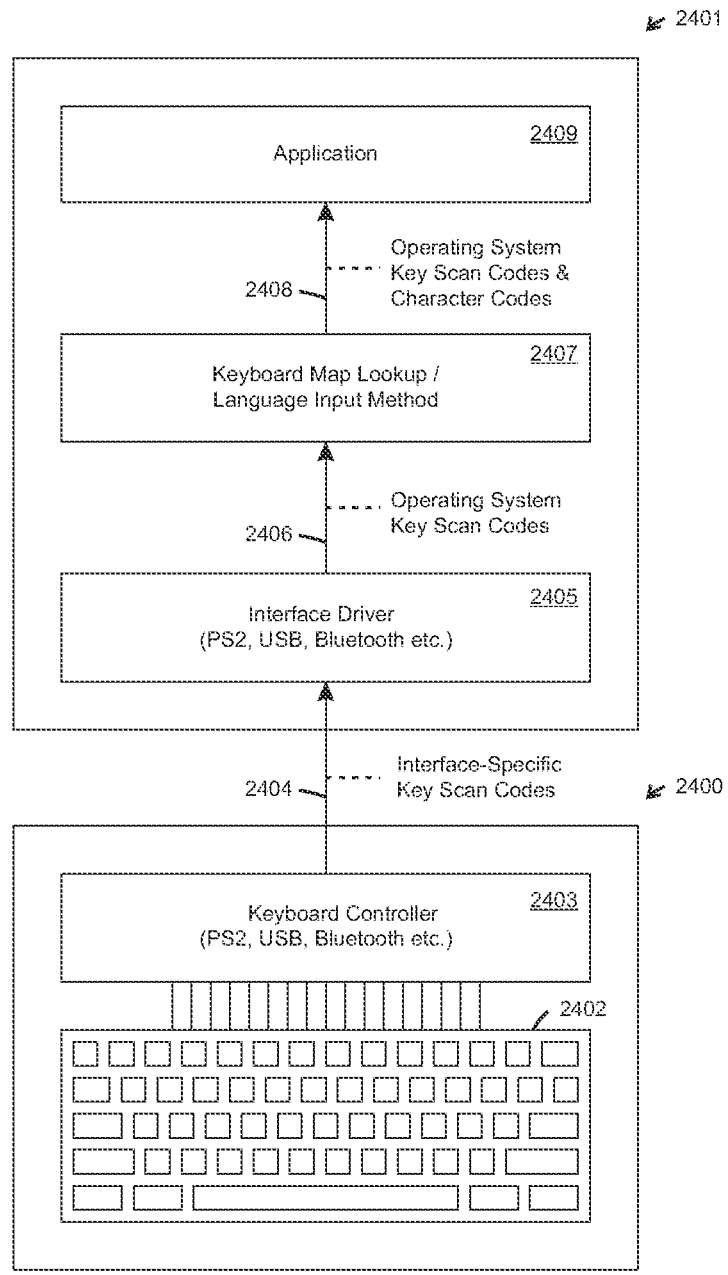
FIG. 24 (prior art) is a block diagram representative of a typical computing device connected to an external QWERTY keyboard.
Figure 25:
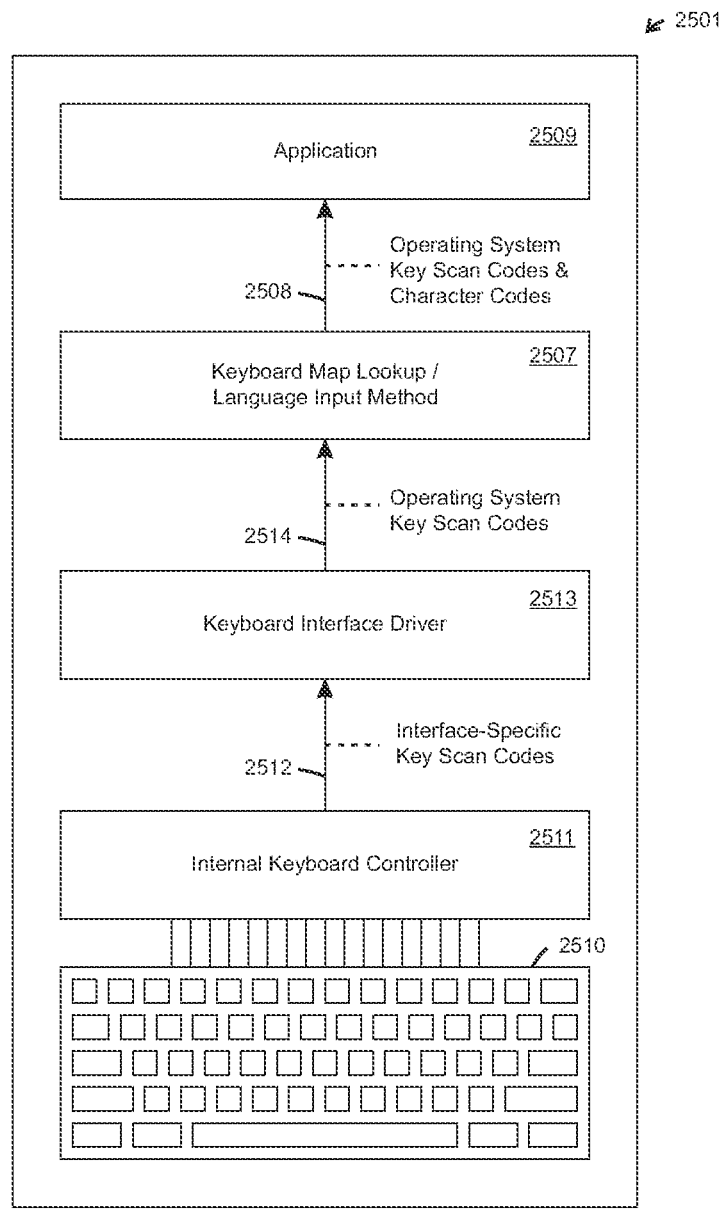
FIG. 25 (prior art) is a block diagram representative of a typical computing device with an integral QWERTY keyboard.
Figure 26:
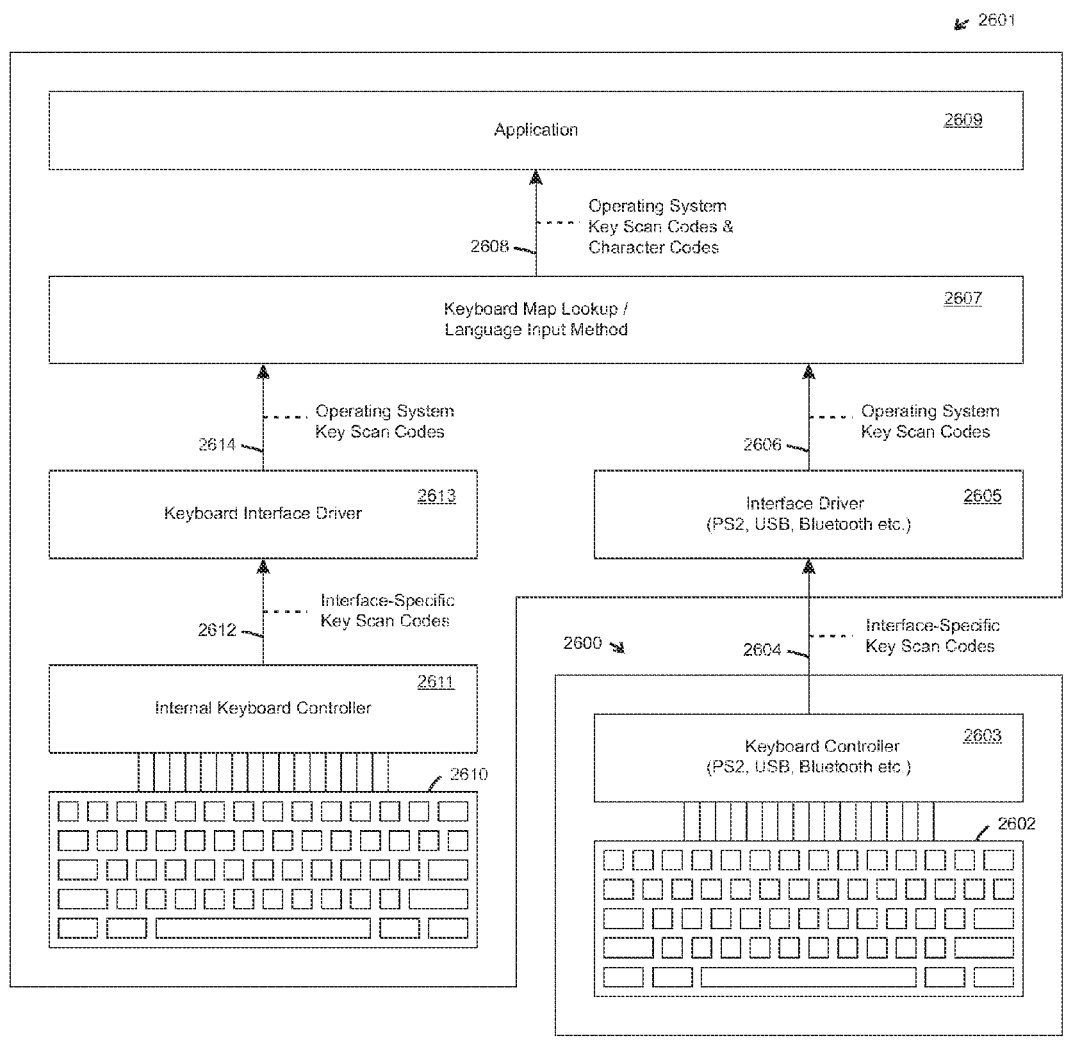
FIG. 26 (prior art) is a block diagram representative of a typical computing device connected to both integral and external QWERTY keyboards.
Figure 27:
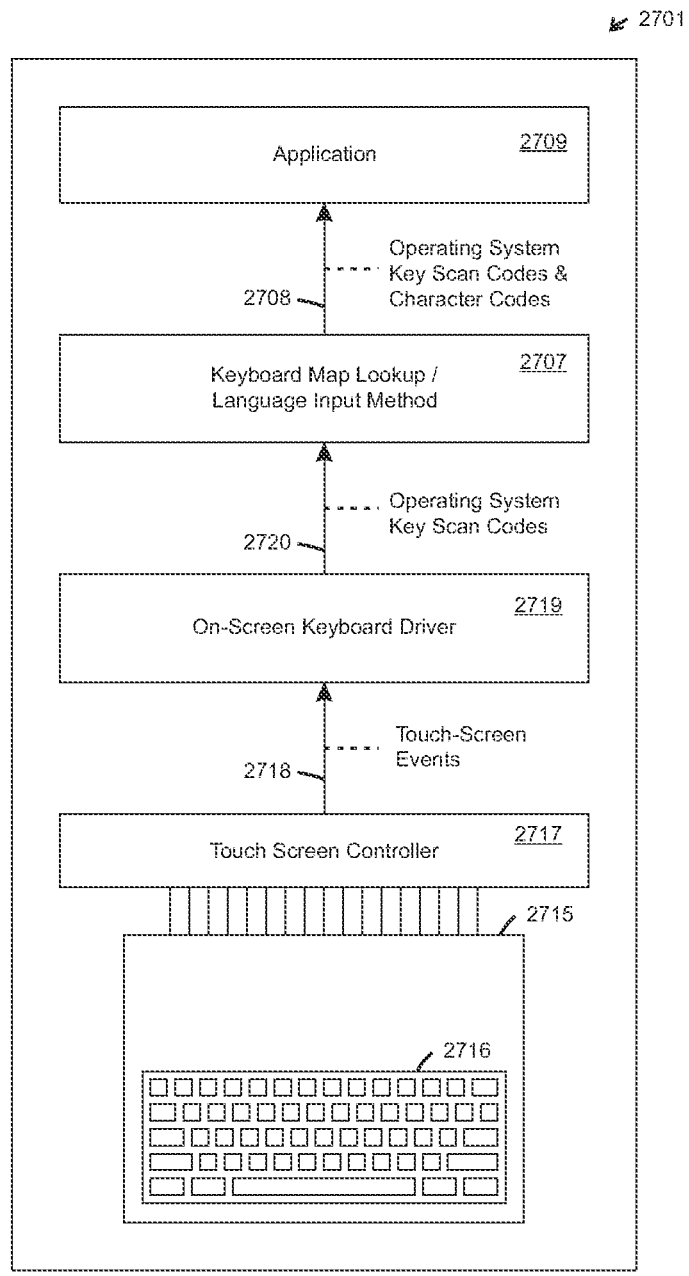
FIG. 27 (prior art) is a block diagram representative of a typical computing device with an integral touch-screen QWERTY keyboard.
Figure 28:
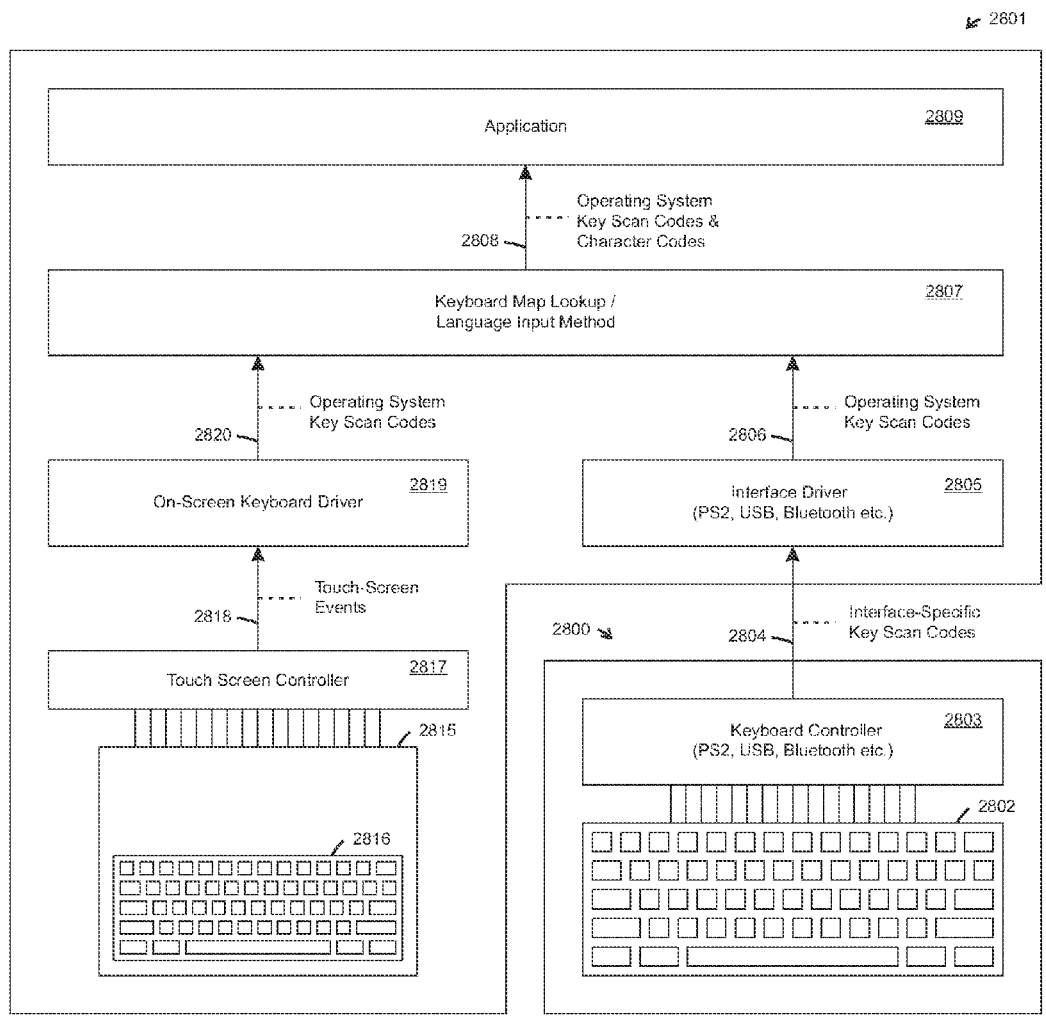
FIG. 28 (prior art) is a block diagram representative of a typical computing device with an integral touch-screen keyboard and external QWERTY keyboard.
Figure 29:
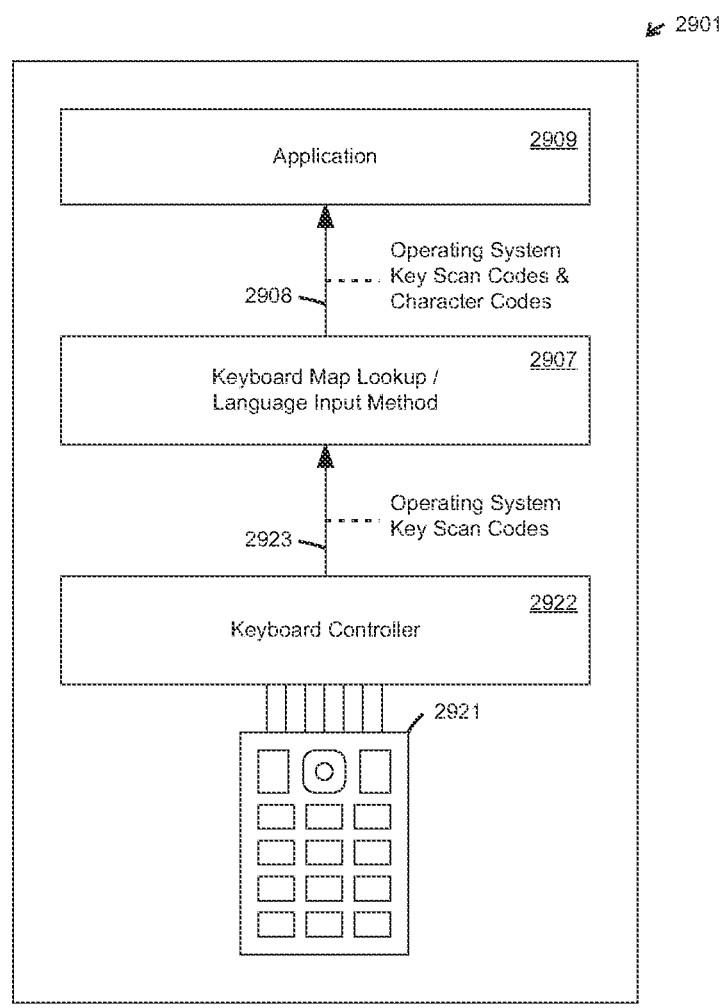
FIG. 29 (prior art) is a block diagram representative of a typical computing device with an integral telephone-like keyboard.

Referring now to FIG. 24, which depicts a conventional computing platform of the present art, certain aspects will be described. Computing device 2401 comprises application software 2409, and most commonly integral to the operating system (not shown) of said computing device, keyboard map lookup and language input method 2407, and interface driver 2405 providing external connectivity by a selected one of a plurality of interface types to external keyboard 2400, as is known in the art. External keyboard 2400 comprises a plurality of keys 2402 and keyboard controller 2403, as is known in the art. When the user (not shown) presses one or more of keys 2402, keyboard controller 2403 detects said presses and generates output comprising key scan codes, said scan codes conforming to the standard defined for said selected interface type, which are conveyed to computing device 2401 via interface 2404, as is known in the art. Said key scan codes received by interface driver 2405 are converted to equivalent key scan codes conforming to the standard defined for said operating system, and conveyed to keyboard map lookup and language input method 2407, which according to the presently selected keyboard map and language converts said key scan codes into character codes and key scan codes which are conveyed to application 2409, as is known in the art.

Now with reference also to FIGS. 25-29 which depict other conventional computing platforms of the present art, certain common aspects will be described. Computing device 2501 in FIG. 25 comprises an integral keyboard, but otherwise conforms to the same structure and comprises the same functional blocks and information flows previously described. Computing device 2601 in FIG. 26 comprises both an integral keyboard and a connected external keyboard 2600, with duplication of certain functional blocks related to each said internal and external keyboard, but otherwise conforms to the same structure and comprises the same functional blocks and information flows previously described. Computing device 2507 in FIG. 27 comprises on-screen keyboard 2716, touch-screen 2715, touch-screen controller 2171 and on-screen keyboard driver 2719. Touch-screen controller 2717 sends touch-screen events 2718 related to user presses of areas of touchscreen 2715 corresponding to on-screen keyboard 2716 to on-screen keyboard driver 2719, wherein said touchscreen events are processed producing operating system key scan codes. Said functional blocks and processes providing equivalent functions to hardware keyboard 2402, 2510, 2602, 2610 and keyboard controller 2403, 2511, 2603, 2611 but otherwise conforming to the same structure and comprising the same effective functional blocks and information flows previously described. Computing device 2801 in FIG. 28 comprises both an on-screen keyboard 2816 and a connected external keyboard 2800, combining the functional blocks related to each said on-screen and external keyboard previously described with reference to FIGS. 24 and 27, but otherwise conforms to the same structure and comprises the same functional blocks and information flows previously described. Computing device 2901 in FIG. 19 comprises telephone-like keyboard 2921, but otherwise conforming to the same structure and comprising the same effective functional blocks and information flows previously described. It will be understood from the forgoing that regardless of the shape, number of keys, embodiment as an on-screen keyboard or a physical keyboard, embodiment integral or external to a computing device, the text input means of computing devices of the present art have in common, the functions of representing individual key presses with key-codes, and converting said key-codes to characters according to a keyboard map and language-specific input methods integral to the computing device.

Figure 30:
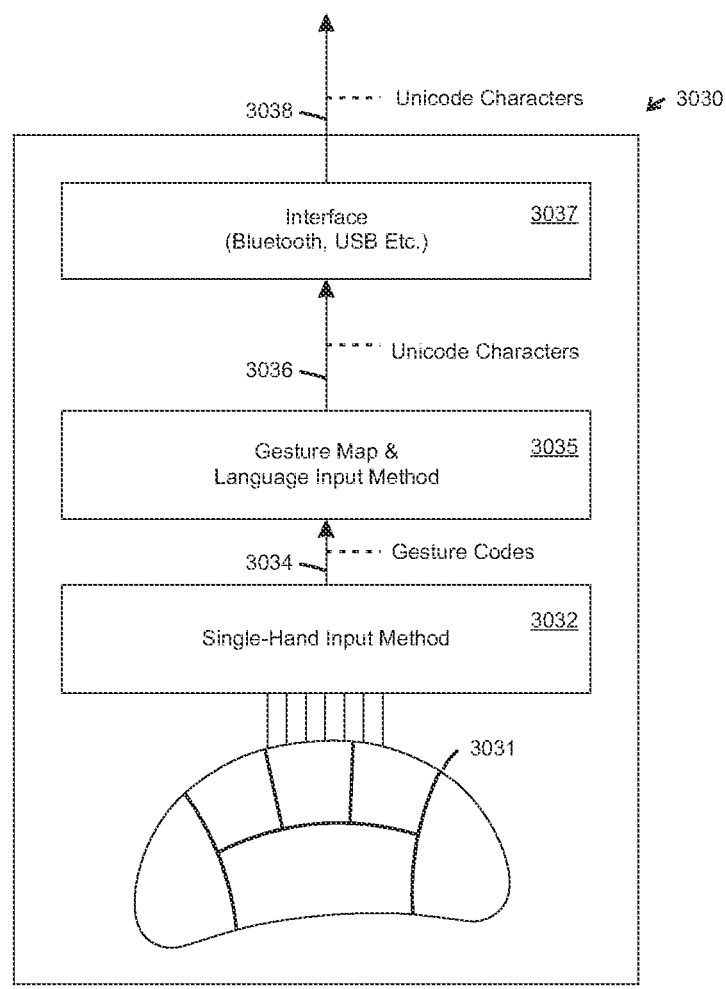
FIG. 30 is a simplified block diagram of an embodiment of the universal script input device of the present invention configured to output only plain text using Unicode characters.

Referring now to FIG. 30, an embodiment of a universal script input device of the present invention will be described. Universal script input device 3030 is similar to universal script input device 1900 previously described in detail with reference to FIGS. 19-23, with less functional detail illustrated as needed for the following description of integration of universal script input device 3030 with various computing devices in FIG. 32. It will be understood that, as depicted, universal script input device 3030 is configured to produce only Unicode text output.

Figure 32:
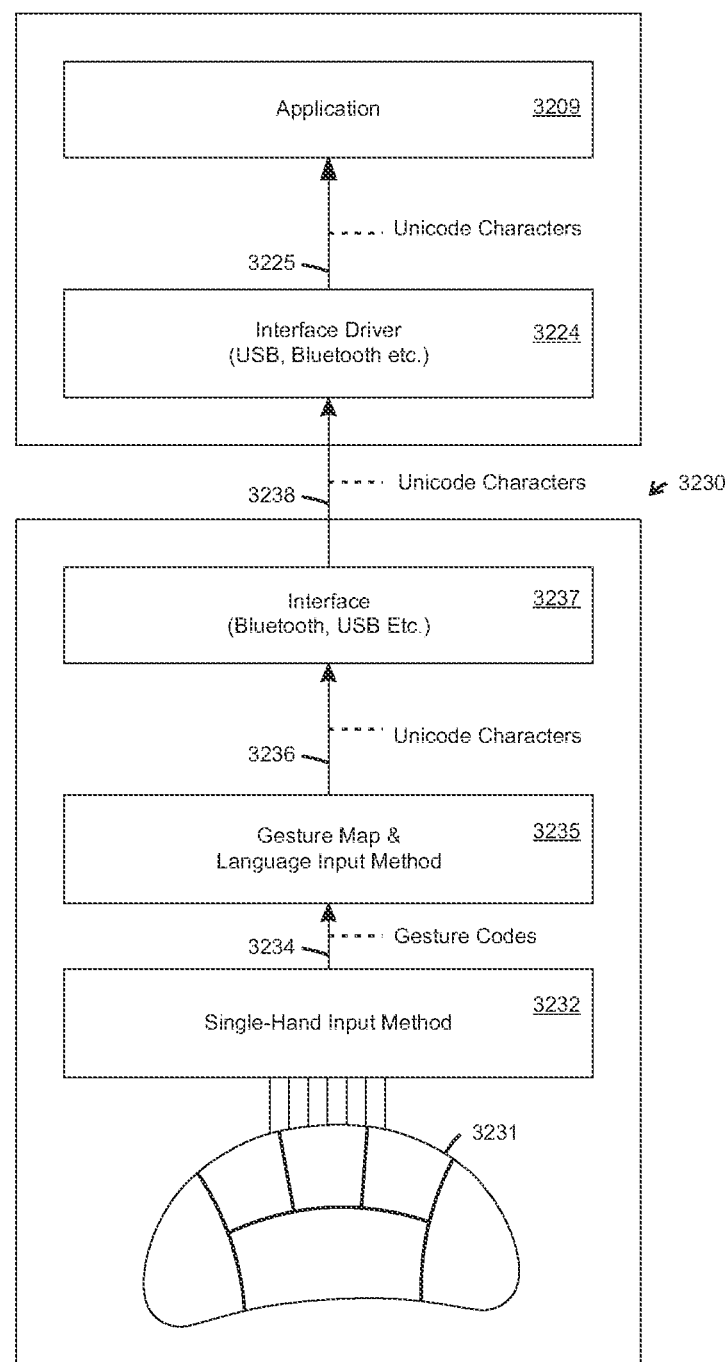
FIG. 32 is a block diagram of the universal script input device in FIG. 30 connected to a typical computing device receiving plain text input.

Referring now also to FIG. 32, an embodiment of a computing device adapted to receive script input exclusively from a universal script input device of the present invention will be described. Universal script input device 3230 is the same as universal script input device 3030, and produces Unicode characters in response to user gestural input, as has been described. Said Unicode characters are conveyed by interface 3237, 3238, to computing device 3201 wherein interface driver 3224 receives and subsequently conveys said Unicode characters to application 3209. It will be understood from the forgoing that computing device 3201 has neither keyboard map lookup nor language-specific processing as do the previously described prior art computing devices. It will be further understood that all script and language-specific information and functions are implemented within universal script input device 3230. It will also be understood that while the forgoing described interface driver 3224 conveying Unicode characters directly to application 3209, other embodiments employing operating system services to effect said conveyance are possible.

Figure 31:
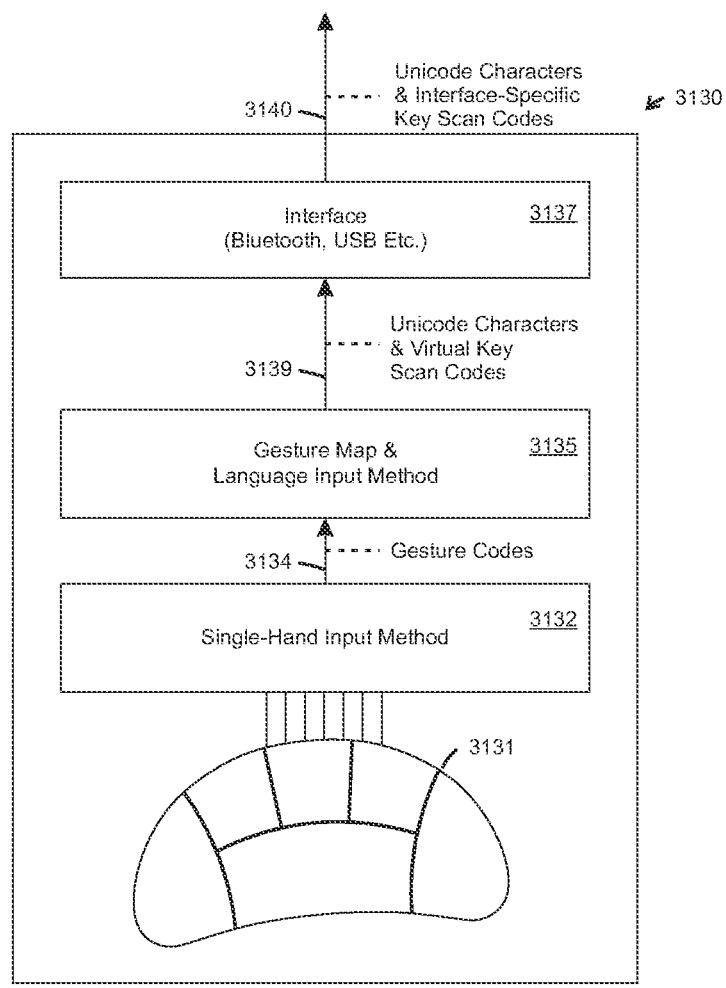
FIG. 31 is a simplified block diagram of an embodiment of the universal script input device of the present invention configured to output plain text using Unicode characters, plain text using key scan codes, and control commands using key scan codes or any combination thereof

Referring now to FIG. 31, an embodiment of a universal script input device of the present invention will be described. Universal script input device 3130 is similar to universal script input device 1900 previously described in detail with reference to FIGS. 19-23, with less functional detail illustrated as needed for the following descriptions of integration of universal script input device 3130 with various computing devices in FIGS. 32-37. It will be understood that, as depicted, universal script input device 3130 is configured to produce Unicode characters and key codes as configured by the presently selected language and platform, as has been described.

Figure 33:
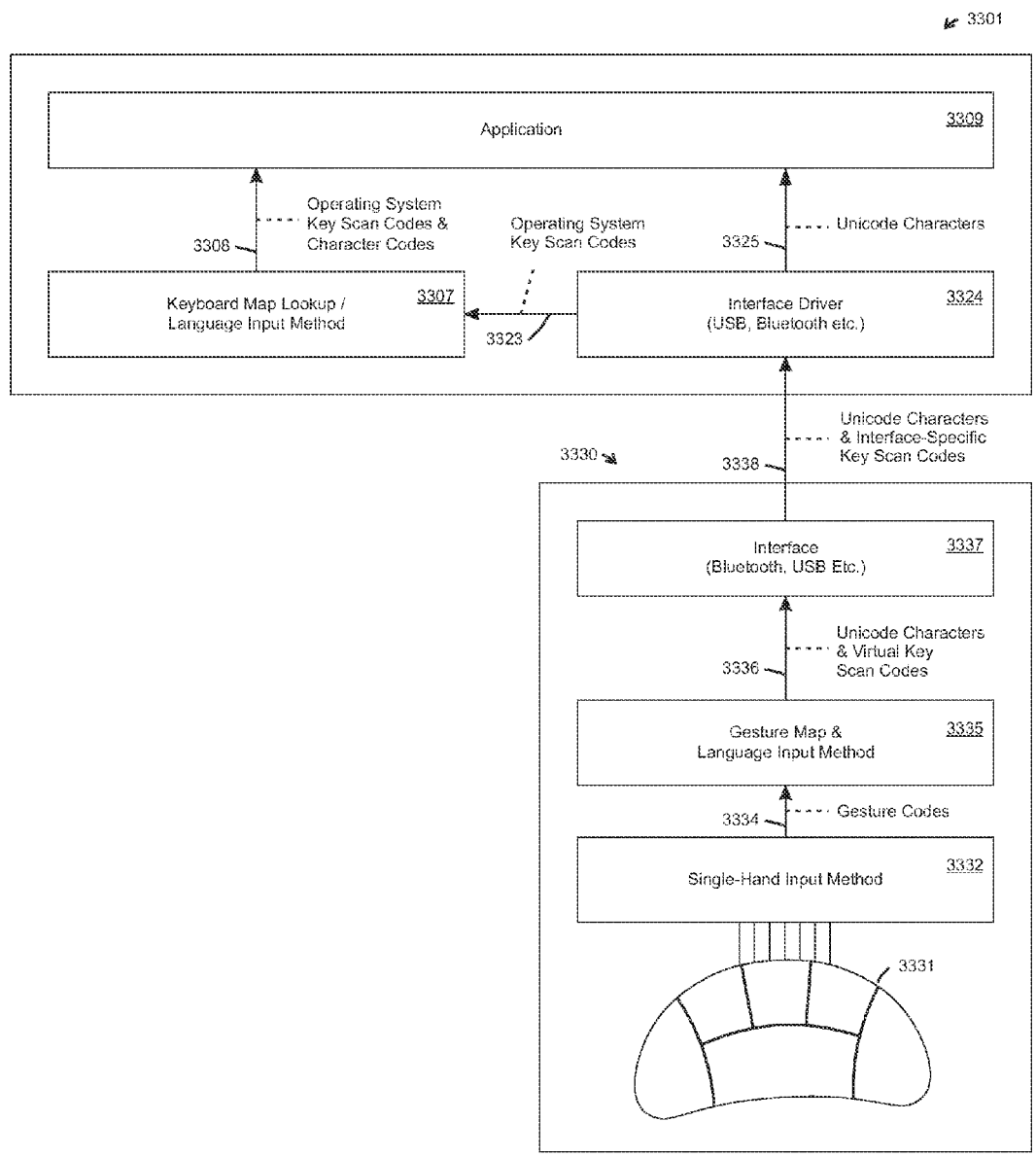
FIG. 33 is a block diagram of the universal script input device in FIG. 31 connected to a typical computing device receiving both key scan code input and plain text input.
Figure 34:
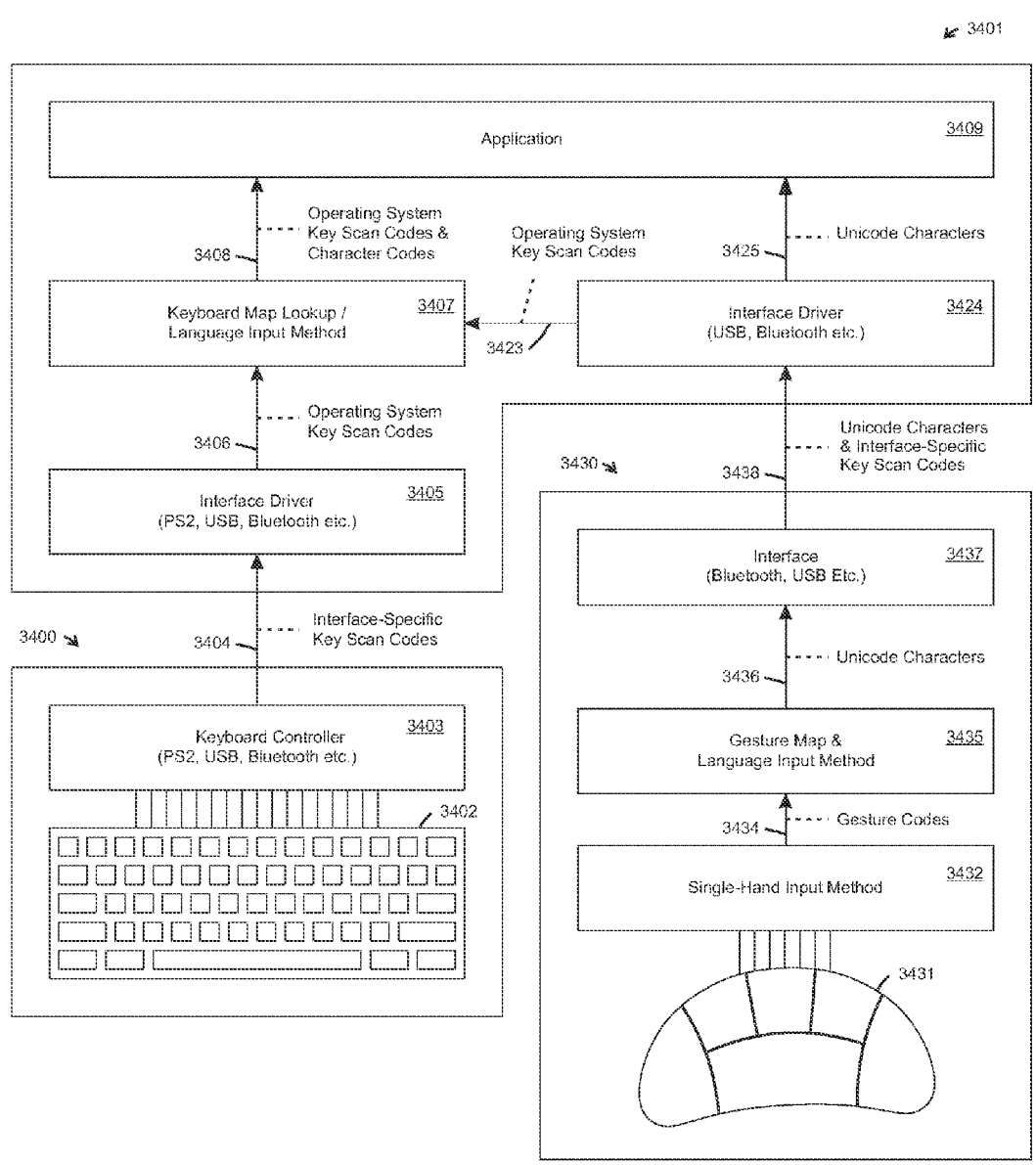
FIG. 34 is a block diagram of the computing device of FIG. 24 additionally receiving plain text input and key scan code input from the universal script input device of FIG. 31.
Figure 35:
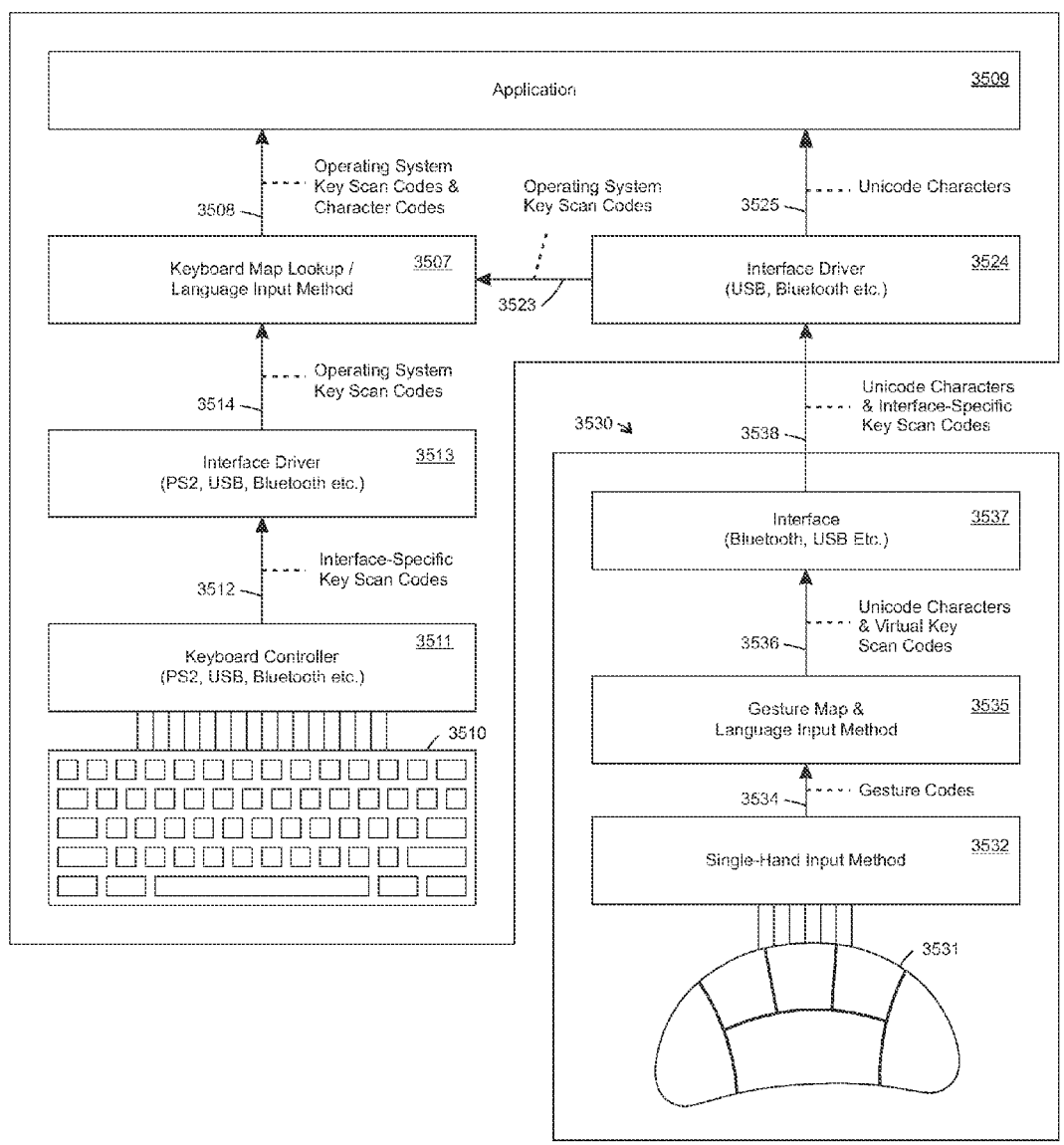
FIG. 35 is a block diagram of the computing device of FIG. 25 additionally receiving plain text input and key scan code input from the universal script input device of FIG. 31.
Figure 36:
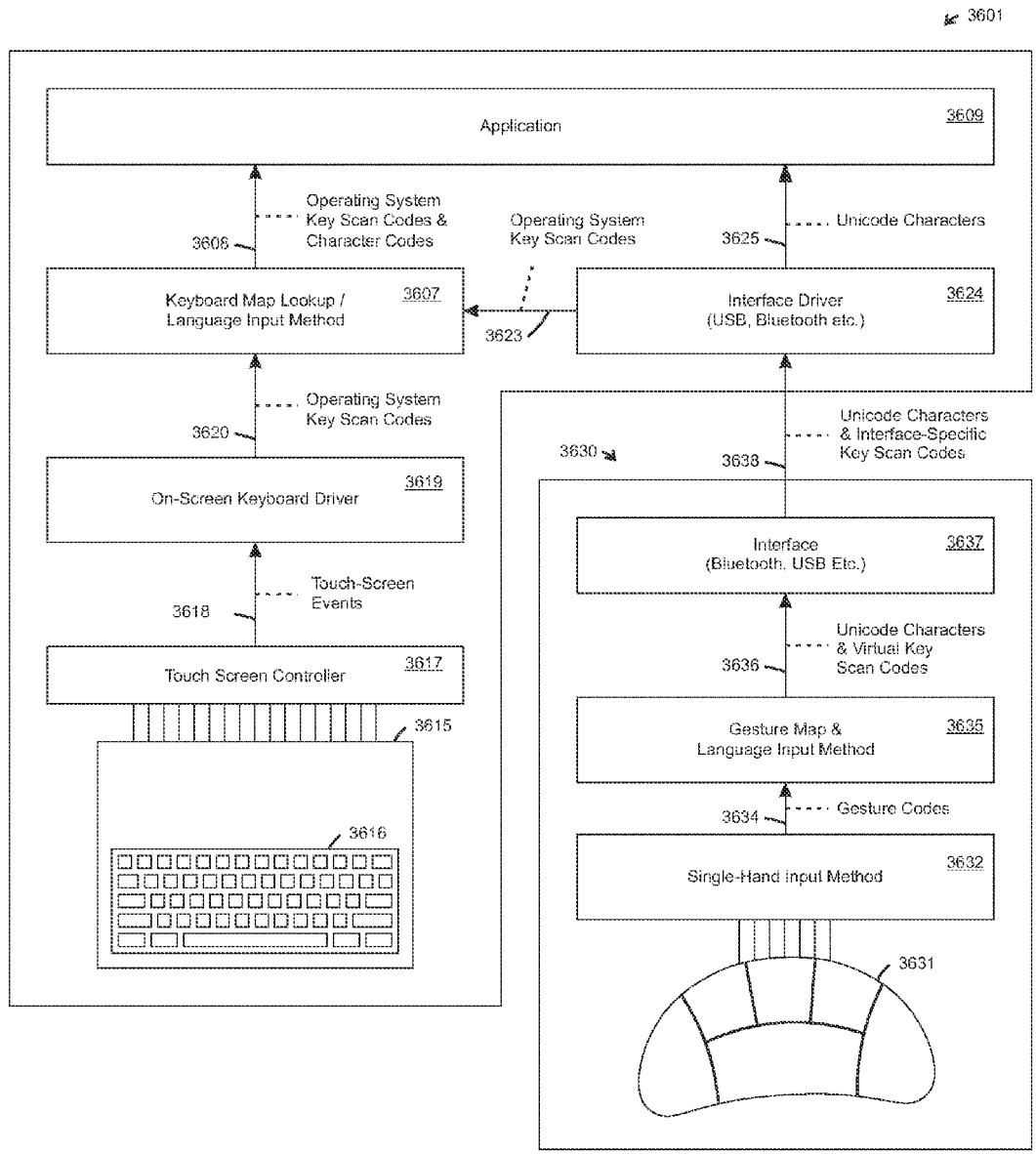
FIG. 36 is a block diagram of the computing device of FIG. 27 additionally receiving plain text input and key scan code input from the universal script input device of FIG. 31.
Figure 37:
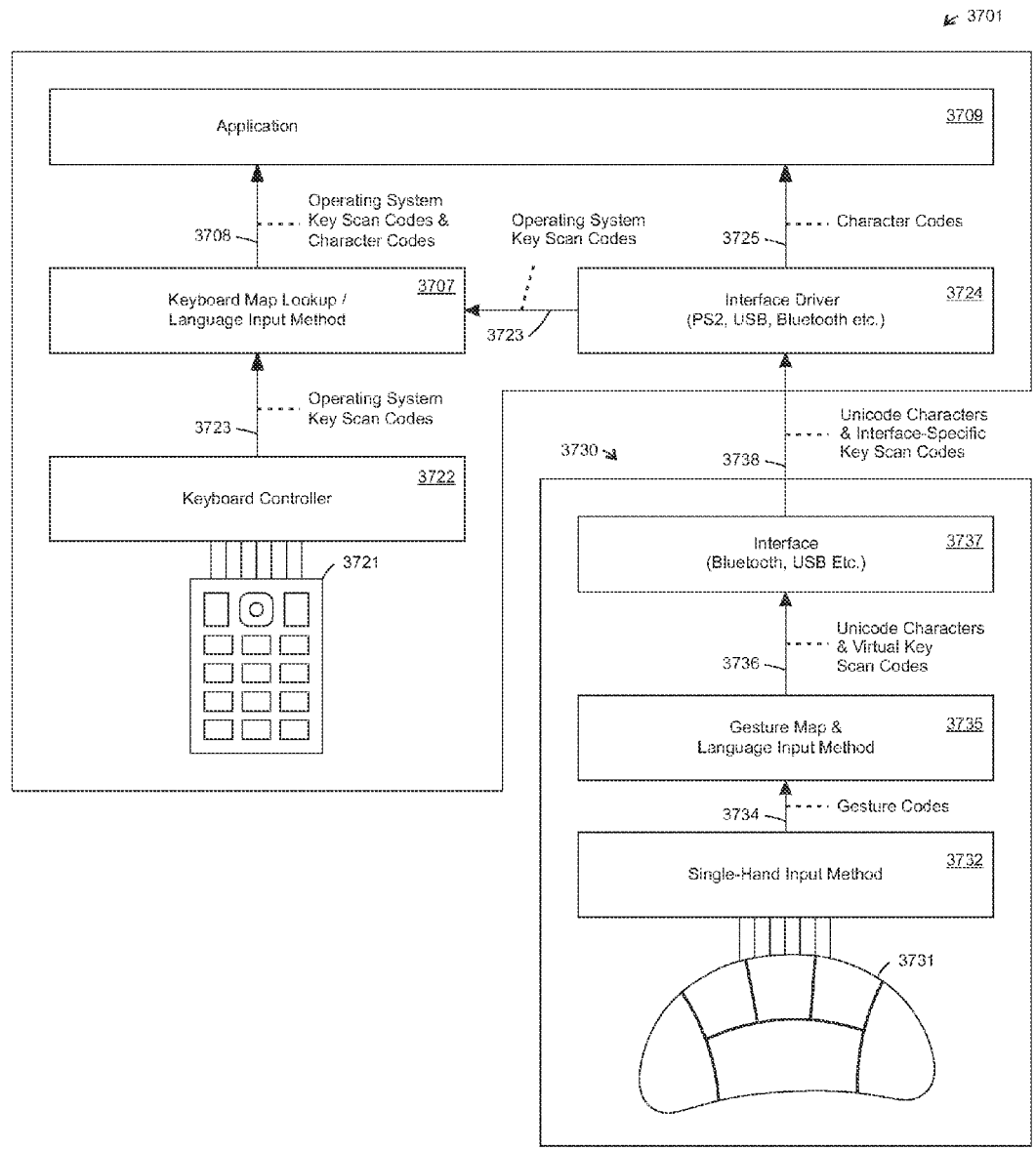
FIG. 37 is a block diagram of the computing device of FIG. 29 additionally receiving plain text input and key scan code input from the universal script input device of FIG. 31.
Figure 38A:
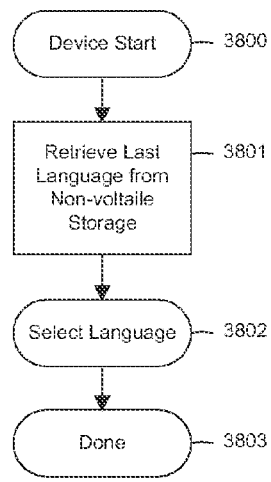
FIG. 38a is a flowchart representing the operation of an embodiment of the universal script input device of the present invention at startup.
Figure 38B:
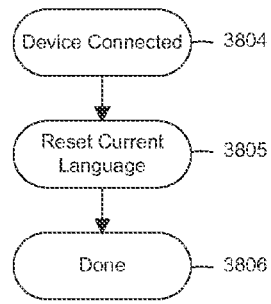
FIG. 38b is a flowchart representing the operation of an embodiment of the universal script input device of the present invention when a computing device is connected.
Figure 38C:
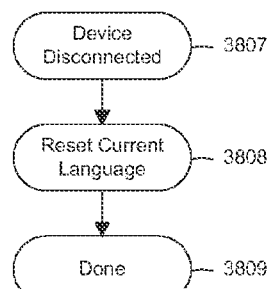
FIG. 38c is a flowchart representing the operation of an embodiment of the universal script input device of the present invention when a computing device is disconnected.
Figure 39A:
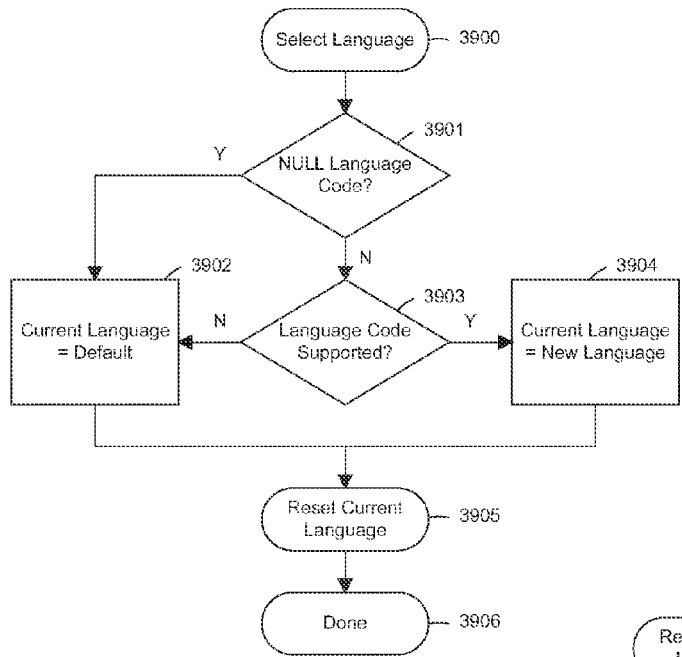
FIG. 39a is a flowchart representing the operation of an embodiment of the universal script input device of the present invention when a language selection operation is performed.
Figure 39B:
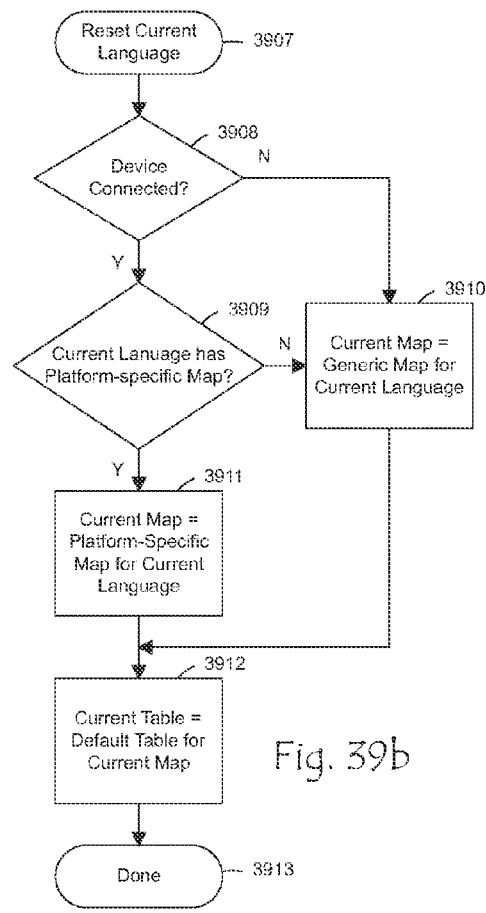
FIG. 39b is a flowchart representing the operation of an embodiment of the universal script input device of the present invention to reset the state of the currently selected language.
Figure 40:
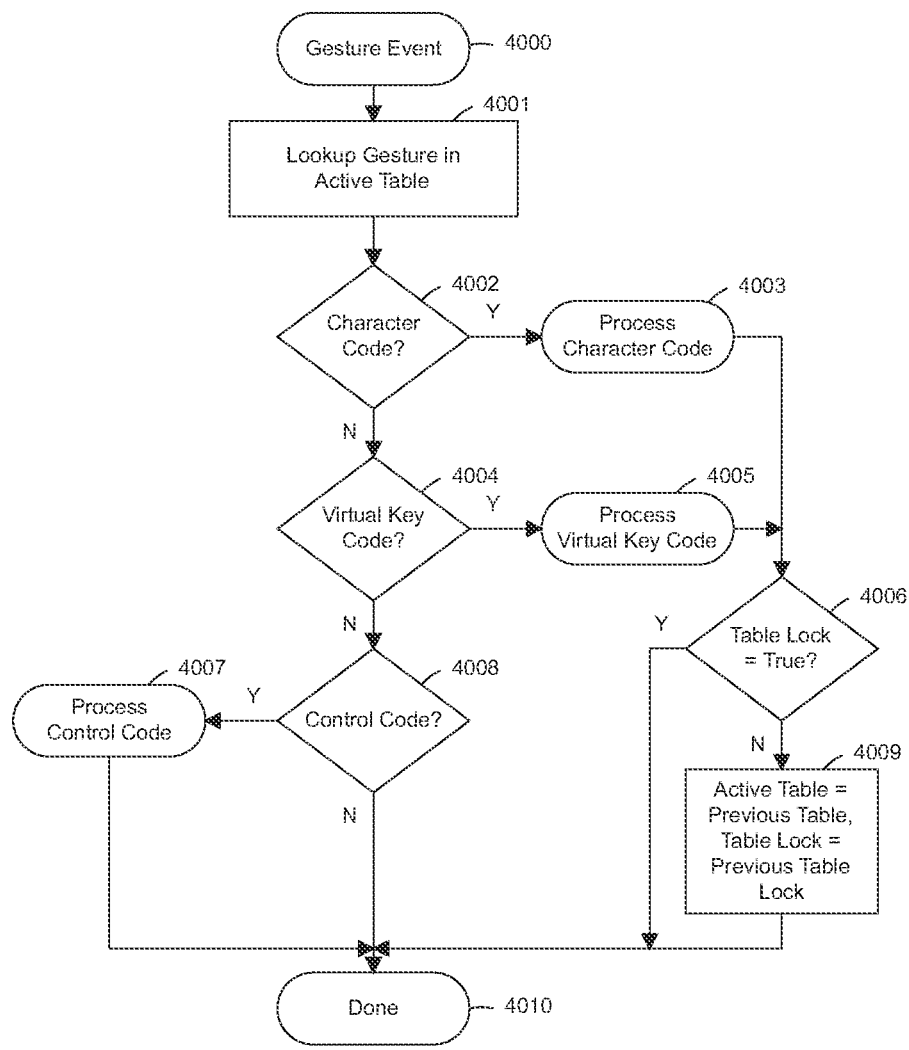
FIG. 40 is a flowchart representing the operation of an embodiment of the universal script input device of the present invention in response to a detected gesture event.
Figure 41A:
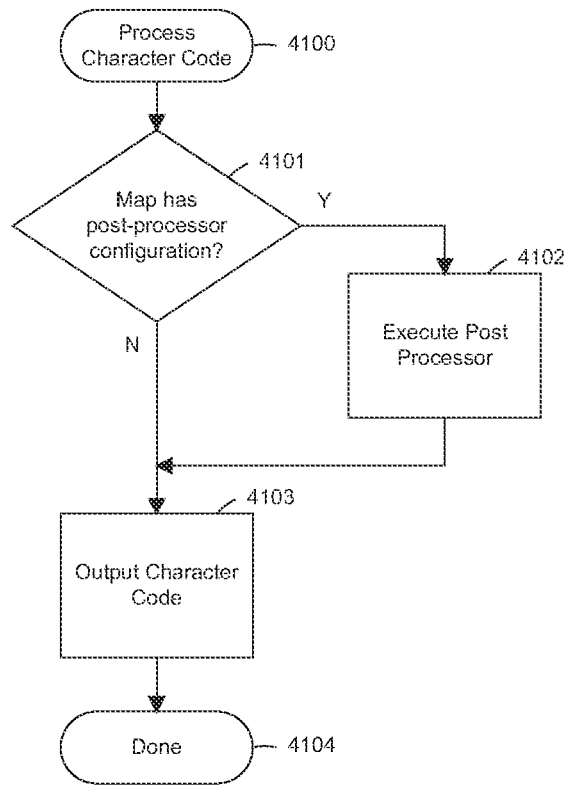
FIG. 41a is a flowchart representing the operation of an embodiment of the universal script input device of the present invention to process a character code.
Figure 41B:
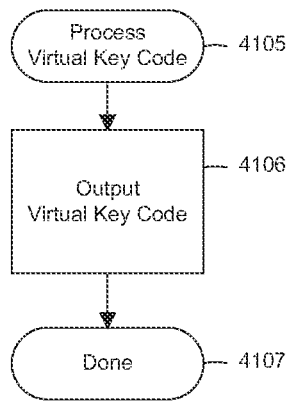
FIG. 41b is a flowchart representing the operation of an embodiment of the universal script input device of the present invention to process a virtual key code.
Figure 42:
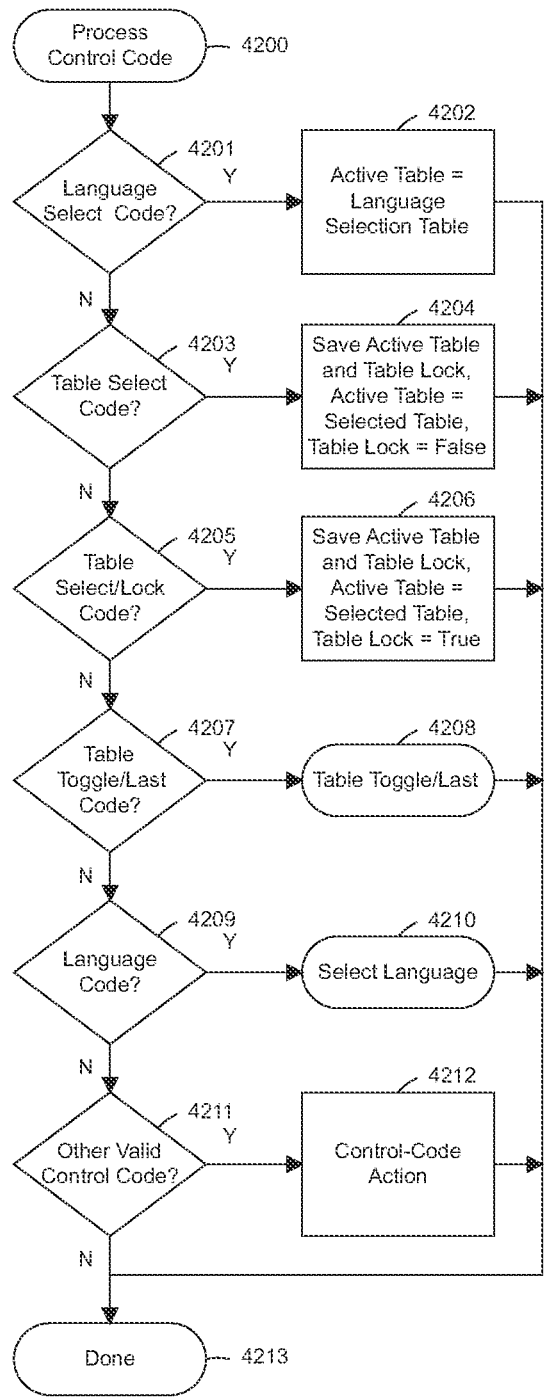
FIG. 42 is a flowchart representing the operation of an embodiment of the universal script input device of the present invention to process a control code.
Figure 43:
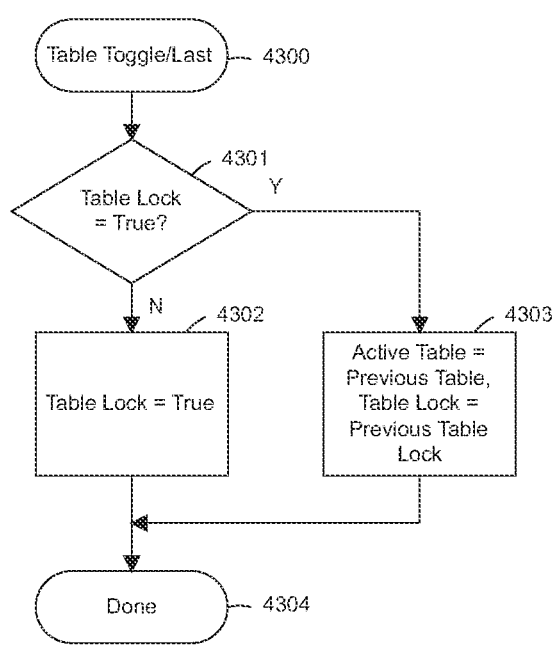
FIG. 43 is a flowchart representing the operation of an embodiment of the universal script input device of the present invention to process a table toggle internal control code.

Referring now also to FIG. 33, a system comprising computing device 3301 equivalent to computing device 2401 in FIG. 24, connected to universal script input device 3330 equivalent to universal script input device 3130 in FIG. 31 will be described. Interface driver 3324 is adapted to receive Unicode characters and interface-specific key scan codes 3338 from universal script input device 3330 and process each as will be described. Upon receipt of each said key scan code, interface driver 3324 converts said key scan code to the equivalent operating system key scan code 3323 which is conveyed to keyboard map lookup 3307 wherein said operating system key scan code is handled according to the same procedures as a key scan code from a conventional keyboard. Upon receipt of each said Unicode character, interface driver 3324 conveys said Unicode character to application 3309. It will be understood from the forgoing that language-specific functions may be included in computing device 3301 or universal script input device 3330. It will be further understood that computing device 3301 can be configured to support script input for which no keyboard map or language-specific input method is available by connecting a suitably configured universal script input device 3330. It will also be understood that while the forgoing described interface driver 3324 conveying Unicode characters directly to application 3309, other embodiments employing operating system services to effect said conveyance are possible.

It will be understood that the forgoing description also applies to the integration of universal script input device 3130 with computing devices 2401, 2501, 2701, 2901 by the addition of interface driver 3424, 3524, 3624, 3724, as shown in FIGS. 34-37.

We claim:

1. A method for universal input of script independent of a computing device's conventional language-specific script input means, comprising:
   a) A means of detecting gestures comprising at least two sequential activations of at least one sensor by at least one digit of at least one hand;
   b) A means of cross referencing said gestures against a predetermined gesture set comprising a plurality of gestures and corresponding result code for each, said corresponding result code comprising either a universal character code or one of a set of predetermined command codes, and selecting the said corresponding result code associated with said gesture;
   c) Using one selected gesture set from a plurality of predetermined gesture sets for purposes of said cross referencing of said gesture;
   d) Said set of predetermined command codes comprising at least one command to select at least one gesture set from said plurality of predetermined gesture sets as the said one selected gesture set;
   e) And a means of conveying said universal character code to a computing device or software process thereon without further processing by said computing device's conventional language-specific script input means, or performing an internal action corresponding to said command code.

2. The method of claim 1 where said universal character code is selected according to the Unicode Standard.

3. The method of claim 2 further comprising:
   a) Said corresponding result code further comprising virtual key codes.

4. The method of claim 3 further comprising:
   a) Processing one said universal character code, or a plurality of consecutive said universal character codes, according to a predetermined algorithm prior to said conveyance to a computing device or software process;
   b) Said predetermined algorithm passing said universal character code, or said plurality of consecutive said universal character codes through unchanged, or substituting or removing one or more said universal character codes, and/or inserting one or more new universal character codes before or after said universal character code, and/or inserting one or more new universal character codes before, within and/or after said plurality of consecutive said universal character codes;
   c) Said predetermined algorithm further comprising means to delete none, one or a plurality of said universal character codes previously conveyed to said computing device or software process.

5. The method of claim 4 further comprising;
   a) At least two said gesture sets with post-processor algorithm selection and configuration information combined as a group, corresponding to a predetermined script or language;
   b) Using one selected algorithm from a plurality of predetermined algorithms for purposes of said processing one said universal character code, or said plurality of consecutive said universal character codes prior to said conveyance to a computing device or software process.

6. The method of claim 5 further comprising:
   a) Using one selected group of gesture sets corresponding to a predetermined script or language, from a plurality of predetermined groups of gesture sets each corresponding to predetermined scripts or languages;
   b) Said set of predetermined command codes further comprising at least one command to select at least one predetermined group of gesture sets corresponding to a predetermined script or language as said selected group of gesture sets.

7. The method of claim 6 further comprising:
a) Said corresponding result code further comprising virtual key codes.

8. The method of claim 7 further comprising:
a) A script/language selection gesture set comprising at least one said script selection command;
b) Said set of predetermined command codes further comprising a command to select said script/language selection table as the said one selected gesture set.

9. The method of claim 8 further comprising:
a) Using one selected gesture set from a plurality of predetermined gesture sets as for purposes of said cross referencing of said gesture;
Said one selected gesture set selected to correspond to the computing device or software process currently connected.

10. A universal script input device, independent of a computing device's conventional language-specific script input means, comprising:
a) At least one sensor coupled to a data processing system to detect and identify one gesture from a plurality of predetermined gestures, each gesture in said plurality of predetermined gestures comprising at least two sequential activations of said at least one sensor by at least one digit of at least one hand;
b) Said data processing system further comprising means to cross-reference said gesture with a predetermined gesture set comprising a plurality of gestures and corresponding result code for each, said corresponding result code comprising either a universal character code or one of a set of predetermined command codes, and select the said corresponding result code associated with said gesture;
c) Said data processing system using one selected gesture set from a plurality of predetermined gesture sets for purposes of said cross referencing of said gesture;
d) Said set of predetermined command codes comprising at least one command to select at least one gesture set from said plurality of predetermined gesture sets as the said one selected gesture set;
e) And said data processing system further comprising means of conveying said universal character code to a computing device or software process thereon without further processing by said computing device's conventional language-specific script input means or performing an internal action corresponding to said command code.

11. The device of claim 10 where said universal character code is selected according to the Unicode Standard.

12. The device of claim 11 with:
a) Said corresponding result code further comprising virtual key codes.

13. The device of claim 12 with:
a) Said data processing system further comprising means to process one said universal character code, or a plurality of consecutive said universal character codes, according to a predetermined algorithm prior to said conveyance to a computing device or software process;
b) Said predetermined algorithm passing said universal character code, or said plurality of consecutive said universal character codes through unchanged, or substituting or removing one or more said universal character codes, and/or inserting one or more new universal character codes before or after said universal character code, and/or inserting one or more new universal character codes before, within and/or after said plurality of consecutive said universal character codes;
c) Said predetermined algorithm further comprising means to delete none, one or a plurality of said universal character codes previously conveyed to said computing device or software process.

14. The device of claim 13 with;
a) At least two said gesture sets with post-processor algorithm selection and configuration information combined as a group, corresponding to a predetermined script or language;
b) Said data processing system further comprising means to use one selected algorithm from a plurality of predetermined algorithms for purposes of said processing one said universal character code, or said plurality of consecutive said universal character codes prior to said conveyance to a computing device or software process.

15. The device of claim 14 with:
a) Said data processing system further comprising means to use one selected group of gesture sets corresponding to a predetermined script or language, from a plurality of predetermined groups of gesture sets each corresponding to predetermined scripts or languages;
b) Said set of predetermined command codes further comprising at least one command to select at least one predetermined group of gesture sets corresponding to a predetermined script or language as said selected group of gesture sets.

16. The device of claim 15 with:
a) Said corresponding result code further comprising virtual key codes.

17. The device of claim 16 with:
a) A script/language selection gesture set comprising at least one said script selection command;
b) Said set of predetermined command codes further comprising a command to select said script/language selection table as the said one selected gesture set.

18. The device of claim 17 with:
a) Said data processing system further comprising means to use one selected gesture set from a plurality of predetermined gesture sets as for purposes of said cross referencing of said gesture;
b) Said one selected gesture set selected to correspond to the computing device or software process currently connected.

* * * * *